US010334435B2

(12) United States Patent
Lee et al.

(10) Patent No.: US 10,334,435 B2
(45) Date of Patent: Jun. 25, 2019

(54) ENHANCED NON-ACCESS STRATUM SECURITY

(71) Applicant: QUALCOMM Incorporated, San Diego, CA (US)

(72) Inventors: Soo Bum Lee, San Diego, CA (US); Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/286,002

(22) Filed: Oct. 5, 2016

(65) Prior Publication Data

US 2017/0318463 A1    Nov. 2, 2017

Related U.S. Application Data

(60) Provisional application No. 62/328,430, filed on Apr. 27, 2016.

(51) Int. Cl.
*H04L 29/06*      (2006.01)
*H04W 12/06*    (2009.01)
(Continued)

(52) U.S. Cl.
CPC .......... *H04W 12/06* (2013.01); *H04L 9/0838* (2013.01); *H04L 63/0428* (2013.01);
(Continued)

(58) Field of Classification Search
CPC ..... H04W 12/06; H04W 76/10; H04W 12/04; H04W 60/00; H04W 12/10; H04W 48/02;
(Continued)

(56) References Cited

U.S. PATENT DOCUMENTS

2007/0297367 A1    12/2007  Wang et al.
2009/0017863 A1*    1/2009  Rowley ................ H04W 12/12
                                                        455/550.1

(Continued)

OTHER PUBLICATIONS

3GPP, "3rd Generation Partnership Project; Technical Specification Group Core Network and Terminals; 3GPP System Architecture Evolution; CT WG1 Aspects (Release 8)," 3GPP Technical Report, Dec. 18, 2008, 215 pgs., 3GPP TR 24.801 V8.1.0, XP050910877, 3rd Generation Partnership Project, Sophia-Antipolis Cedex, France.

(Continued)

*Primary Examiner* — Brandon S Hoffman
*Assistant Examiner* — William A Corum, Jr.
(74) *Attorney, Agent, or Firm* — Holland & Hart LLP

(57) ABSTRACT

A user equipment (UE) may be configured to transmit a registration message to a network to establish a secure connection for non-access stratum (NAS) messages between the network and a UE, the secure connection based at least in part on a UE identifier and security capabilities of the UE included in the registration message. The UE may then exchange NAS methods with the network over the secure connection. The UE may also establish, in response to the registration message, an authentication protocol with the network and encrypt subsequent NAS messages based in part on the authentication protocol.

46 Claims, 20 Drawing Sheets

(51) Int. Cl.
| | |
|---|---|
| *H04L 9/08* | (2006.01) |
| *H04W 12/04* | (2009.01) |
| *H04W 12/10* | (2009.01) |
| *H04W 48/02* | (2009.01) |
| *H04W 60/00* | (2009.01) |
| *H04W 76/10* | (2018.01) |
| *H04W 8/24* | (2009.01) |
| *H04W 12/02* | (2009.01) |

(52) U.S. Cl.
CPC ......... *H04L 63/0869* (2013.01); *H04W 12/04* (2013.01); *H04W 12/10* (2013.01); *H04W 48/02* (2013.01); *H04W 60/00* (2013.01); *H04W 76/10* (2018.02); *H04L 2209/80* (2013.01); *H04W 8/24* (2013.01); *H04W 12/02* (2013.01)

(58) Field of Classification Search
CPC ... H04W 36/0038; H04W 8/24; H04W 12/02; H04L 63/0869; H04L 9/0838; H04L 63/0428; H04L 2209/80
See application file for complete search history.

(56) References Cited

U.S. PATENT DOCUMENTS

| | | | | |
|---|---|---|---|---|
| 2009/0025060 | A1* | 1/2009 | Mukherjee | H04W 12/02 726/3 |
| 2009/0111423 | A1* | 4/2009 | Somasundaram | H04W 12/02 455/410 |
| 2010/0054472 | A1 | 3/2010 | Barany et al. | |
| 2010/0115275 | A1* | 5/2010 | Suh | H04W 12/08 713/168 |
| 2011/0142239 | A1* | 6/2011 | Suh | H04W 12/02 380/270 |
| 2011/0300828 | A1* | 12/2011 | Wass | H04L 63/12 455/410 |
| 2011/0314287 | A1* | 12/2011 | Escott | H04L 63/061 713/171 |
| 2012/0210397 | A1* | 8/2012 | Suh | H04W 12/06 726/3 |
| 2013/0042011 | A1* | 2/2013 | Sugizaki | H04Q 3/0045 709/227 |
| 2014/0141782 | A1* | 5/2014 | Rantala | H04W 36/0066 455/436 |
| 2015/0143463 | A1* | 5/2015 | Baghel | H04W 12/02 726/3 |
| 2015/0249900 | A1* | 9/2015 | Kim | H04W 24/10 370/252 |
| 2016/0094542 | A1* | 3/2016 | Lee | H04L 63/06 726/7 |
| 2016/0095065 | A1* | 3/2016 | Richards | H04W 52/0209 370/311 |
| 2017/0188303 | A1* | 6/2017 | Bas Sanchez | H04W 52/0216 |
| 2017/0195882 | A1* | 7/2017 | Liao | H04W 12/08 |
| 2017/0223538 | A1* | 8/2017 | Hahn | H04W 8/20 |
| 2017/0264439 | A1* | 9/2017 | Muhanna | H04L 9/0861 |
| 2017/0325139 | A1* | 11/2017 | Norrman | H04W 40/04 |
| 2018/0013568 | A1* | 1/2018 | Muhanna | H04L 9/3242 |
| 2018/0041901 | A1* | 2/2018 | Yilmaz | H04W 12/04 |

OTHER PUBLICATIONS

3GPP, "3rd Generation Partnership Project; Technical Specification Group Core Network and Terminals; Non-Access-Stratum (NAS) Protocol for Evolved Packet System (EPS); Stage 3; (Release 13)," 3GPP Technical Specification, Mar. 18, 2016, 414 pgs, 3GPP TS 24.301 V13,5.0, XP051088177, 3rd Generation Partnership Project, Sophia-Antipolis Valbonne, France.

ISA/EP, International Search Report and Written Opinion of the International Searching Authority, Int'l Application No. PCT/US2017/024260, dated Jun. 12, 2017, European Patent Office, Rijswijk, NL, 16 pgs.

* cited by examiner

ENHANCED NON-ACCESS STRATUM SECURITY

CROSS REFERENCES

The present application for patent claims priority to U.S. Provisional Patent Application No. 62/328,430 by Lee, et al., entitled "Enhanced Non-Access Stratum Security," filed Apr. 27, 2016, assigned to the assignee hereof.

BACKGROUND

The following relates generally to wireless communication, and more specifically to enhanced non-access stratum (NAS) security.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A UE, therefore, may participate in communications with a network. Some network communications may be between a UE and a core network, which may include a protocol stack for facilitating the network communications. One functional layer used in the core network protocol stack is a NAS layer. The NAS layer is a set of protocols and is generally used to convey non-radio signaling between a UE and a mobility management entity (MME) for access to a network (such as a Long Term Evolution (LTE) network or an evolved universal mobile telephone system (UMTS) terrestrial radio access network (E-UTRAN)). In some examples, the NAS layer may be used to manage the establishment of communication sessions with a UE and for maintaining continuous communications with a UE as the UE moves. In some examples, network access may be provided when a UE transmits an attach request to the NAS layer. The NAS layer may respond by allowing the UE to attach to the network.

In some instances, network communications may be protected. Protected communications may include communications that contain private or confidential information. However, some types of network communications may lack protection or security. In particular, messages communicated before security algorithms have been agreed upon between a UE and a core network may lack adequate protection. As another example, messages for establishing communication may also lack adequate security. Unprotected NAS messages, and in particular, those used to attach a UE to a network, may be examples of such unprotected communications. Unprotected communications may be subject to exploitation by attackers, for example.

SUMMARY

A user equipment (UE) may be configured to establish a secure non-access stratum (NAS) connection with a core network based on an authentication and key agreement (AKA). To do so, a UE may send an initial registration request to a network. The registration request may be limited in its contents. For example, the registration request may be limited to include the identification of the UE and the UE's security capabilities. Other information, including information that a user may desire to have protected or transmitted over a secure connection, may not be included in the registration request but may instead be included in subsequent secure transmissions. For example, after an AKA procedure is performed and a secure NAS connection is established, the UE may perform an attach procedure with the network over the secure NAS connection. Because the attach procedure is over a secure connection, the attach procedure may include additional information that a user may want to be protected. The attach request may be transmitted along with a NAS security mode complete message from the UE to the network. The established NAS message security may apply to subsequent NAS messages in different UE operating modes after a successful registration and in subsequent re-registration attempts by the UE.

A method of wireless communication is described. The method may include transmitting a registration message to a network to establish a secure connection for at least NAS messages between the network and a wireless device, the secure connection based at least in part on a wireless device identifier and security capabilities of the wireless device included in the registration message and exchanging NAS messages with the network over the secure connection.

An apparatus for wireless communication is described. The apparatus may include means for transmitting a registration message to a network to establish a secure connection for at least NAS messages between the network and a wireless device, the secure connection based at least in part on a wireless device identifier and security capabilities of the wireless device included in the registration message and means for exchanging NAS messages with the network over the secure connection.

A further apparatus is described. The apparatus may include a processor, memory in electronic communication with the processor, and instructions stored in the memory. The instructions may be operable to cause the processor to transmit a registration message to a network to establish a secure connection for at least NAS messages between the network and a wireless device, the secure connection based at least in part on a wireless device identifier and security capabilities of the wireless device included in the registration message and exchange NAS messages with the network over the secure connection.

A non-transitory computer readable medium for wireless communication is described. The non-transitory computer-readable medium may include instructions to cause a processor to transmit a registration message to a network to establish a secure connection for at least NAS messages between the network and a wireless device, the secure connection based on a wireless device identifier and security capabilities of the wireless device included in the registration message and exchange NAS messages with the network over the secure connection.

In some examples of the method, apparatus, or non-transitory computer-readable medium described above, exchanging NAS messages may include transmitting an attach request to access the network. In some examples of the method, apparatus, or non-transitory computer-readable medium described above, the attach request is piggybacked to a security mode complete message transmitted to the network. In some examples of the method, apparatus, or non-transitory computer-readable medium described above, the registration message is an attach request message, a tracking area update (TAU) request message, or a service request message.

Some examples of the method, apparatus, or non-transitory computer-readable medium described above may further include processes, features, means, or instructions for performing, in response to the registration message, a mutual authentication and key agreement with the network. Some examples of the method, apparatus, or non-transitory computer-readable medium described above may further include processes, features, means, or instructions for encrypting subsequent NAS messages based in part on the key agreement established as a result of a successful authentication with the network.

Some examples of the method, apparatus, or non-transitory computer-readable medium described above may further include processes, features, means, or instructions for entering into a deregistered state with the network. Some examples of the method, apparatus, or non-transitory computer-readable medium described above may further include processes, features, means, or instructions for transmitting, while in the deregistered state, an attach request, the attach request being encrypted and integrity protected under the mutual authentication and key agreement.

Some examples of the method, apparatus, or non-transitory computer-readable medium described above may further include processes, features, means, or instructions for entering into a registered state with the network. Some examples of the method, apparatus, or non-transitory computer-readable medium described above may further include processes, features, means, or instructions for transmitting, while in the registered state, the subsequent NAS messages with encryption and integrity protection in accordance with the mutual authentication and key agreement.

Some examples of the method, apparatus, or non-transitory computer-readable medium described above may further include processes, features, means, or instructions for entering into an idle state with the network. Some examples of the method, apparatus, or non-transitory computer-readable medium described above may further include processes, features, means, or instructions for transmitting, upon exiting the idle state, a service request that includes a first portion of the service request having integrity protection based on a security context established during the successful authentication with the network and a second portion of the service request having encryption and integrity protection based on the security context.

In some examples of the method, apparatus, or non-transitory computer-readable medium described above, the first portion includes at least one of the wireless device identifier or a key set identifier.

Some examples of the method, apparatus, or non-transitory computer-readable medium described above may further include processes, features, means, or instructions for transmitting an attach request, a service request, or a TAU message. Some examples of the method, apparatus, or non-transitory computer-readable medium described above may further include processes, features, means, or instructions for receiving a reject message associated with the transmitted attach request, service request, or TAU message, where the reject message is not encrypted or integrity protected based on a security context established during the successful authentication with the network. Some examples of the method, apparatus, or non-transitory computer-readable medium described above may further include processes, features, means, or instructions for transmitting a second registration message to the network to establish security with the network based on the wireless device identifier and security capabilities of the wireless device included in the second registration message.

Some examples of the method, apparatus, or non-transitory computer-readable medium described above may further include processes, features, means, or instructions for waiting a predetermined amount of time after receiving the reject message. Some examples of the method, apparatus, or non-transitory computer-readable medium described above may further include processes, features, means, or instructions for re-transmitting the previously transmitted attach request, service request, or TAU message prior to transmitting the second registration message.

In some examples of the method, apparatus, or non-transitory computer-readable medium described above, performing the mutual authentication and key agreement may include communicating between the wireless device and a component of the network that is configured for securing NAS messages.

Some examples of the method, apparatus, or non-transitory computer-readable medium described above may further include calculating a hash of the registration request, receiving a hash of the registration request from the network subsequent to the transmitted registration message, and determining whether the values of the calculated hash and the received hash match. Some examples may further include retransmitting at least one information element contained within the registration message upon determining that the calculated and received hash values do not match. Some methods may further include retransmitting the registration message to the network upon determining that the calculated and received hash values do not match.

A method of wireless communication is described. The method may include receiving a registration message from a wireless device to establish a secure connection for at least NAS messages between the wireless device and a network, the secure connection based at least in part on a wireless device identifier and security capabilities of the wireless device included in the registration message and exchanging NAS messages with the wireless device over the secure connection.

An apparatus for wireless communication is described. The apparatus may include means for receiving a registration message from a wireless device to establish a secure connection for at least NAS messages between the wireless device and a network, the secure connection based at least in part on a wireless device identifier and security capabilities of the wireless device included in the registration message and means for exchanging NAS messages with the wireless device over the secure connection.

A further apparatus is described. The apparatus may include a processor, memory in electronic communication with the processor, and instructions stored in the memory. The instructions may be operable to cause the processor to receive a registration message from a wireless device to establish a secure connection for at least NAS messages between the wireless device and a network, the secure connection based at least in part on a wireless device identifier and security capabilities of the wireless device included in the registration message and exchange NAS messages with the wireless device over the secure connection.

A non-transitory computer readable medium for wireless communication is described. The non-transitory computer-readable medium may include instructions to cause a processor to receive a registration message from a wireless device to establish a secure connection for at least NAS messages between the wireless device and a network, the secure connection based on a wireless device identifier and security capabilities of the wireless device included in the registration message and exchange NAS messages with the wireless device over the secure connection.

In some examples of the method, apparatus, or non-transitory computer-readable medium described above, exchanging NAS messages may include receiving an attach request from the UE to access the network. In some examples of the method, apparatus, or non-transitory computer-readable medium described above, the attach request is piggybacked to a security mode complete message transmitted to the network. In some examples of the method, apparatus, or non-transitory computer-readable medium described above, the registration message is an attach request message.

Some examples of the method, apparatus, or non-transitory computer-readable medium described above may further include processes, features, means, or instructions for performing, in response to the registration message, a mutual authentication and key agreement with the wireless device. Some examples of the method, apparatus, or non-transitory computer-readable medium described above may further include processes, features, means, or instructions for encrypting subsequent NAS messages based in part on the key agreement established as a result of a successful authentication with the wireless device.

Some examples of the method, apparatus, or non-transitory computer-readable medium described above may further include processes, features, means, or instructions for receiving an attach request, a service request, or a TAU message. Some examples of the method, apparatus, or non-transitory computer-readable medium described above may further include processes, features, means, or instructions for transmitting a reject message associated with the received attach request, service request, or TAU message, where the reject message is not encrypted or integrity protected based on a security context established during the successful authentication with the wireless device. Some examples of the method, apparatus, or non-transitory computer-readable medium described above may further include processes, features, means, or instructions for receiving a second registration message from the wireless device to establish security with the wireless device based on the wireless device identifier and security capabilities of the wireless device included in the second registration message.

In some examples of the method, apparatus, or non-transitory computer-readable medium described above, performing the mutual authentication and key agreement comprises: communicating between the wireless device and a component of the network that is configured for securing NAS messages.

DETAILED DESCRIPTION

A non-access stratum (NAS) layer is a set of protocols used to convey non-radio signaling between a UE and a mobility management entity (MME) for access to a network (such as a Long Term Evolution (LTE) network or an evolved universal mobile telephone system (UMTS) terrestrial radio access network (E-UTRAN)). The main functions of the protocols that are a part of the NAS may include the support of UE mobility, evolved packet-switched system (EPS) bearer management, authentication, security control, and connection management. A UE may communicate with the NAS via messages transmitted between the UE and the NAS. Typically, a first NAS message between a UE and an MME may be an attach request, though other message types may include a service request or a connectivity request message. If the UE is new to the network the MME may also ask for the UE's identity (e.g., an international mobile subscriber identify (IMSI)).

The initial messages sent between a UE and an MME may be unprotected. Thus, the contents of these initial messages may be readable by outside parties and attackers (e.g., by decoding the message sent over a wireless medium or by impersonating a base station). As a result, outside parties or attackers may discover private information about the UE or its user, or may even exploit the intercepted information and disable certain services to the UE.

Accordingly, wireless systems may include NAS security procedures to mitigate the capabilities of attackers or other third parties from obtaining private information. NAS security procedures may utilize a registration protocol between a UE and a network that reduces the amount of unsecured information relative to a conventional registration or attach protocol. Once a NAS connection is secure, the UE and the network may commence an attach procedure and subsequently exchange information using the secure NAS connection. As explained herein, some benefits of this technique may include attack mitigation (such as mitigation of bidding-down attacks) and privacy enhancement, all of which may be provided without additional messaging overhead relative to at least some fourth generation (4G) attach procedures.

Aspects of the disclosure are initially described in the context of a wireless communication system. Specific examples are described for transmitting a registration request for establishing a secure NAS connection between a UE and a network, and then initiating an attach procedure over the secure NAS connection. Aspects of the disclosure are further illustrated by and described with reference to apparatus diagrams, system diagrams, and flowcharts that relate to enhanced NAS security.

Figure 1:
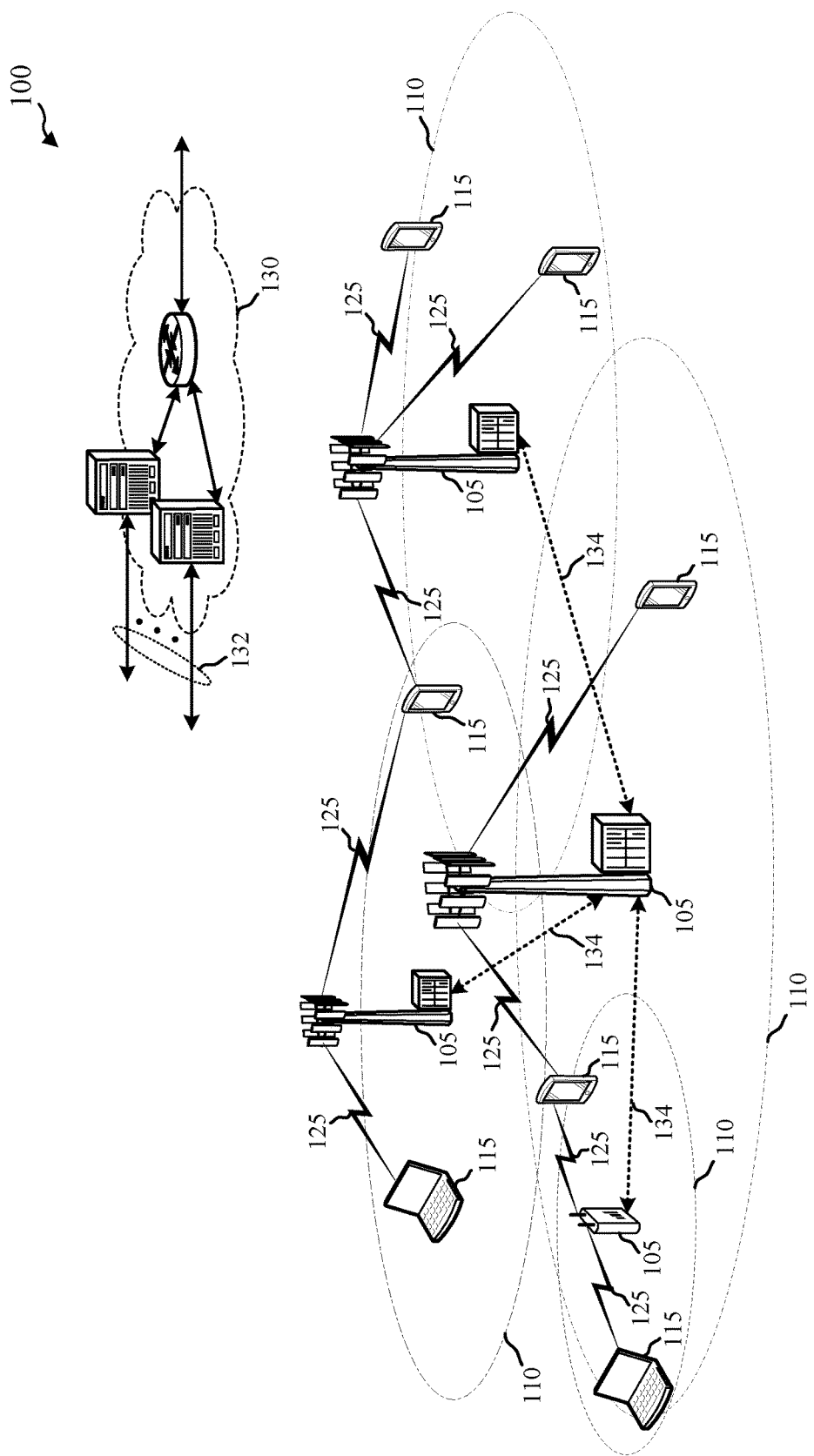
FIG. 1 illustrates an example of a wireless communications system that supports enhanced non-access stratum (NAS) security in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In some examples, the wireless communications system 100 may be a fifth generation (5G) ecosystem featuring a high frequency communication system such as a millimeter wave (mmW) system for mobile communications. In order to facilitate secure NAS communications, wireless communications system 100 may include UEs 115 that transmit a registration request for establishing a secure NAS connection between a UE 115 and the core network 130, and then initiate an attach procedure over the secure NAS connection.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an appliance, an automobile, a machine type communication (MTC) device, etc.

In some examples of the wireless communications system 100, base stations 105 or UEs 115 may include multiple antennas for employing antenna diversity schemes to improve communication quality and reliability between base stations 105 and wireless devices 115. Additionally or alternatively, base stations 105 or wireless devices 115 may employ multiple input multiple output (MIMO) techniques that may take advantage of multi-path environments to transmit multiple spatial layers carrying the same or different coded data.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs).

In an example, a base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. User internet protocol (IP) packets may be transferred through the S-GW, which itself may be connected to the P-GW. The P-GW may provide IP address allocation as well as other functions. The P-GW may be connected to the network operator's IP services. The operator's IP services may include the Internet, an Intranet, an IP Multimedia Subsystem (IMS), or a Packet-Switched (PS) Streaming Service (PSS). While NAS security may be provided via the MME, the core network 130 may also include a separate component that is configured for securing NAS messages. Core network 130 may be comprised of several components of telecommunications architecture that may include a data plane and a control plane. The data plane may carry network user traffic while the control plane may carry signaling traffic and may be responsible for routing.

A UE 115 may use various identifiers during communications with the core network 130 (via, for example base stations 105). For example, a subscriber information module (SIM) at UE 115 may be an integrated circuit (IC) that securely stores the UE's IMSI and the related key used to identify and authenticate a UE 115. A SIM may also contain a unique serial number (e.g., an IC card identification (ID) (ICCID)), security authentication and ciphering information, temporary information related to the local network, a list of available services, a personal ID number (PIN), and a personal unblocking code (PUK) for PIN unlocking. In some cases, a SIM may be a circuit embedded in a removable plastic card.

Communications between a UE 115 and a core network 130 may include NAS communications. As explained herein, a NAS layer is a functional layer used in the protocol stacks between a UE 115 and a core network 130, and may be implemented by an MME located at the core network 130. In some examples, a first NAS message between a UE 115 and an MME may be an attach request. Traditionally, an attach request may include an ID of the UE 115, but may also include other information related to the UE 115 or its user. The other information may include private information of the UE or its user. Thus, if the private information is included in an unsecured NAS communication (e.g., an unprotected NAS message), the private information may be read by third parties for whom the private information is not intended. Unsecured NAS messages may also be subject to interception and other malicious attacks.

Figure 2A:
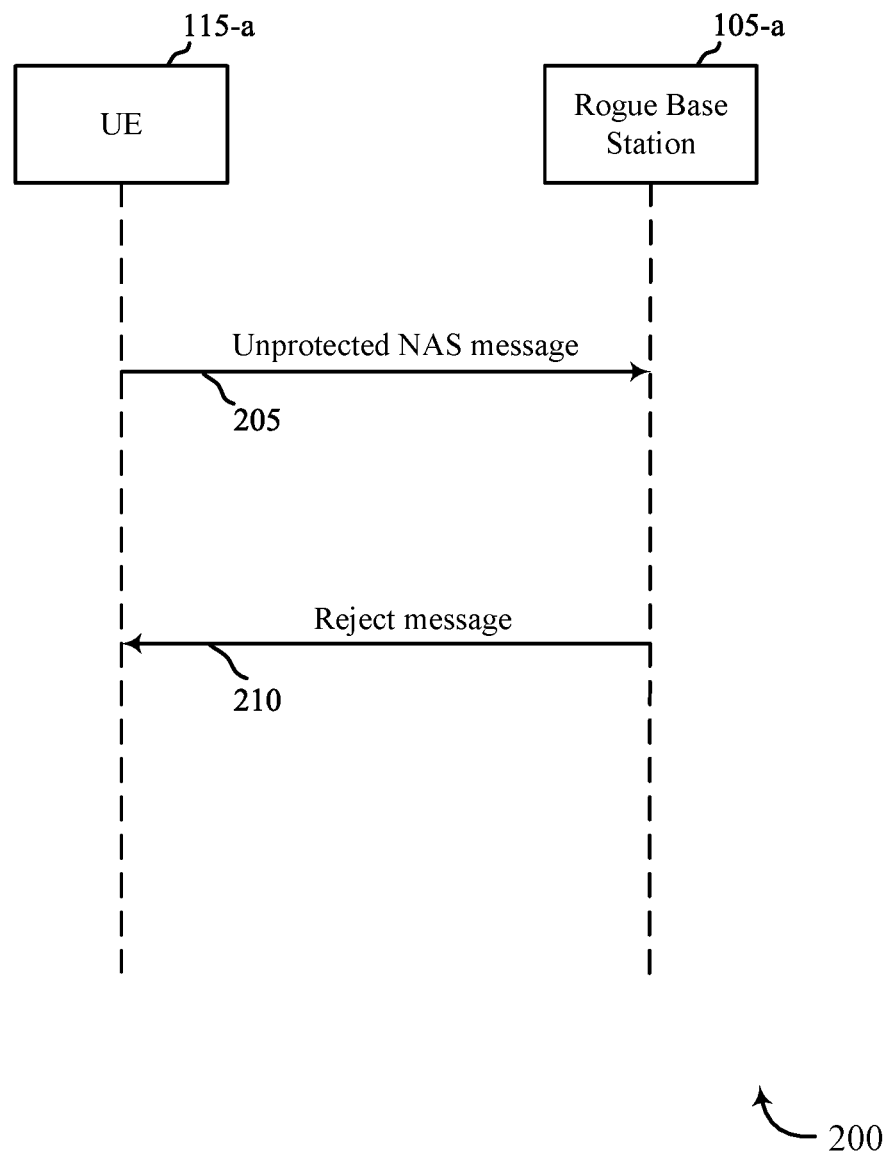
FIGS. 2A and 2B show flow diagrams that illustrate issues in transmitting unprotected NAS messages.

FIG. 2A shows a flow diagram 200 that illustrates issues that may occur in transmitting unprotected NAS messages. FIG. 2A depicts a UE 115-a and a rogue base station 105-a engaging in wireless communications, which may be examples of the corresponding devices described with reference to FIG. 1. Unprotected NAS messages may be intercepted and exploited by attackers such as rogue base station 105-a. Unprotected NAS message 205 is transmitted by UE 115-a and received by rogue base station 105-a. Rogue base station 105-a may then extract private information about UE 115-a from message 205 such as the UE's capabilities and ID.

In another instance, rogue base station 105-a may launch a denial of service (DoS) attack on UE 115-a. For example, rogue base station 105-a may receive a tracking area update (TAU) request message in message 205. In a normal TAU request, UE 115-a may inform the UE's serving network about the UE's present location in order to facilitate network services to the UE 115-a. However, in this scenario, rogue base station 105-a may reject the TAU request from UE 115-a in reject message 210 which may cause UE 115-a to consider a universal subscriber identity module (USIM) as invalid for EPS services and non-EPS services until UE 115-*a* switches off or the universal integrated circuit card (UICC) containing the USIM is removed. Unprotected NAS messages that may be subject to DoS attacks include attach reject, TAU reject, service reject, and network initiated detach request messages.

Figure 2B:
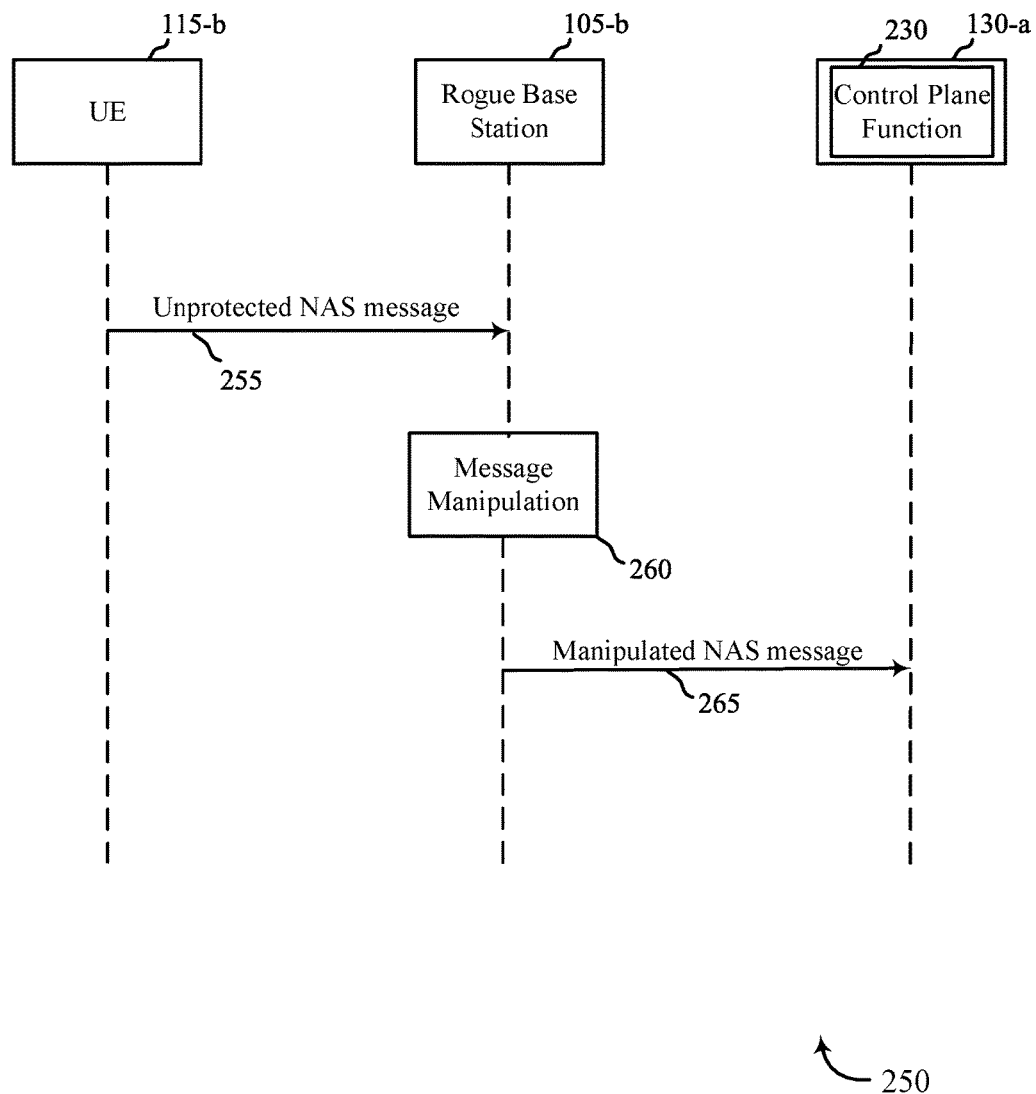

FIG. 2B shows a flow diagram 250 that illustrates another issue that may occur in transmitting unprotected NAS messages. In particular, flow diagram 250 depicts a "bidding-down attack." FIG. 2B depicts a UE 115-*b*, rogue base station 105-*b*, and core network 130-*a* engaging in wireless communications, which may be examples of the corresponding devices described with reference to FIG. 1. As illustrated in FIG. 2B, the core network 130-*a* may include multiple components, including a control plane function 230 which may participate in NAS communication. In the example of FIG. 2B, UE 115-*b* initiates an attach request message in the form of an unprotected NAS message 255 to rogue base station 105-*b*. Unprotected NAS message 255 may contain voice domain preference information and the UE's usage setting that informs the rogue base station 105-*b* of the UE's voice calling capabilities. In message manipulation step 260, rogue base station 105-*b* may remove these capabilities from the unprotected NAS message 255 and may then change an information element such as "Additional Update Type" to "short message service (SMS) only," for example. Rogue base station 105-*b* may then forward the changed message (in the form of a manipulated NAS message 265) to the UE's serving network, core network 130-*a*. Core network 130-*a* may then accept the manipulated NAS message 265 and perform an authorization procedure with UE 115-*b* using this message to complete an attach procedure. Thus, under this scenario, core network 130-*a* may configure the profile of UE 115-*b* such that it enables only SMS and data services. UE 115-*b* would then be unable to send or receive voice calls. Other examples of bidding-down attacks may also be applied. In some examples, wireless devices other than rogue base station 105-*b* may be utilized for bidding-down attacks.

Figure 3A:
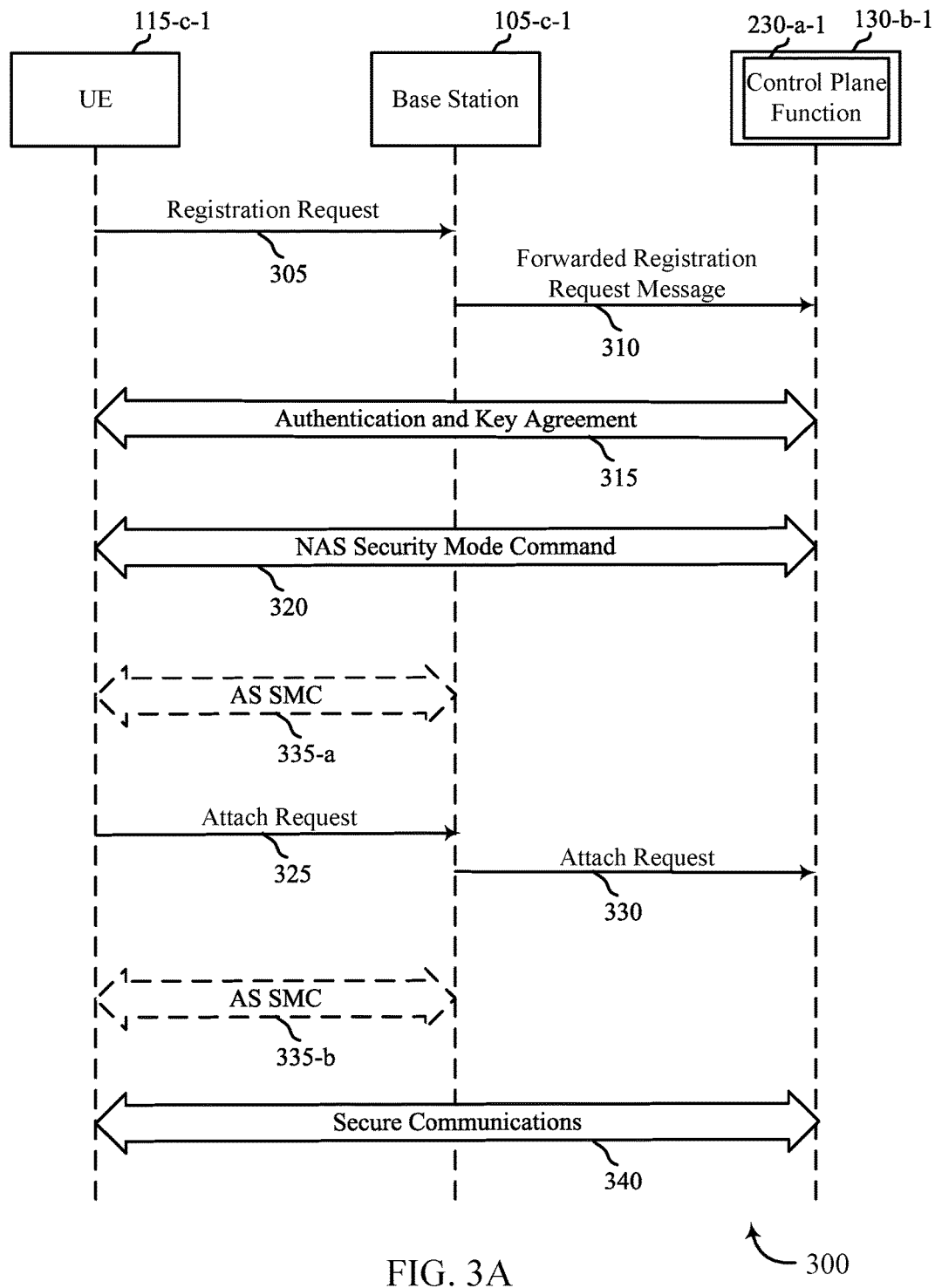
FIGS. 3A and 3B show flow diagrams that illustrate a secure connection protocol to protect NAS messages sent by a user equipment (UE) in accordance with aspects of the present disclosure.

FIG. 3A shows a flow diagram 300 that illustrates a secure connection protocol to protect NAS messages sent by a UE 115-*c*-1. In some cases, flow diagram 300 may represent aspects of techniques performed by a UE 115, base station 105, or core network 130 as described with reference to FIGS. 1-2. In establishing a secure NAS connection, UE 115-*c*-1 may send a registration request 305 containing minimal UE capability information to base station 105-*c*-1. This minimal UE capability information may include the UE identity (e.g., IMSI or a private mobile subscriber identity (PMSI)) and the UE security capability (e.g., supported encryption and integrity protection algorithms). Base station 105-*c*-1 may then forward this information to a component of core network 130-*b*-1 (such as a control plane function 230-*a*-1) via forwarded registration request message 310. Upon receiving message 310, core network 130-*b*-1 may then commence an authentication and key agreement (AKA) protocol 315 with UE 115-*c*-1. In some examples, if UE 115-*c*-1 uses a temporary identity that is not recognized by core network 130-*b*-1, then core network 130-*b*-1 may request the UE's identity before commencing AKA protocol 315 with UE 115-*c*-1. The AKA protocol 315 provides procedures for mutual authentication of UE 115-*c*-1 and core network 130-*b*-1. The AKA protocol 315 may involve a specialized security unit, entity, or function associated with core network 130-*b*-1 that is responsible for the AKA protocol 315. In some examples, the specialized security unit may be a security key management function (SKMF).

In other examples, the specialized security unit may be a mobility management entity (MME).

Subsequent to establishing AKA protocol 315, a NAS security mode command (SMC) procedure 320 may be used in order to establish a secure NAS connection between UE 115-*c*-1 and core network 130-*b*-1 (via, for example, the control plane function 230-*a*-1). The NAS SMC procedure 320 may include an exchange of messages, for example. In one example, the NAS SMC procedure 320 may include transmission of a NAS SMC message from the core network 130-*b*-1 to the UE 115-*c*-1, with the UE 115-*c*-1 responding via a NAS SMC complete message, thereby ensuring that subsequent NAS messages would be encrypted and secured in accordance with the AKA protocol 315. After a successful NAS SMC procedure 320 is conducted between UE 115-*c*-1 and core network 130-*b*-1, subsequent NAS messages between UE 115-*c*-1 and core network 130-*b*-1 may be protected, which includes encryption and integrity protection. In one instance, once the NAS connection is secured, base station 105-*c*-1 may send an access stratum (AS) SMC 335-*a* to UE 115-*c*-1 in order to activate security in the AS and to establish a secure channel between the UE 115-*c*-1 and the base station 105-*c*-1. In other instances, the AS SMC 335-*b* may be sent after an attach procedure.

Once the NAS connection is secured, UE 115-*c*-1 may also send attach request 325 to base station 105-*c*-1. Attach request 325 may include the capabilities of UE 115-*c*-1 not included in the registration request 305, and may be used to request services (e.g., voice data, SMS, etc.). Base station 105-*c*-1 may then forward the attach request 325 to core network 130-*b*-1 via attach request 330. Upon receipt of the attach request 330, core network 130-*b*-1 may then create a wireless communication session with UE 115-*c*-1. Upon establishing a session, subsequent NAS messages between UE 115-*c*-1 and core network 130-*b*-1 may be protected using the established security context as shown in secure communications 340.

In some instances, the registration request 305 may itself be or include an attach request, tracking area update (TAU) request, or service request. In these instances, the UE 115-*c*-1 may calculate a hash of registration request 305. A secure hash algorithm (SHA), e.g., SHA-1, SHA-2, or SHA-3 may be used to calculate the hash. The UE 115-*c*-1 may optionally indicate in the registration request that the UE 115-*c*-1 requests the core network 130-*b*-1 to send the hash of the registration request message in a response or other subsequent message (e.g., NAS SMC message). A component of the core network 130-*b*-1 (such as an MME) may include a hash of registration request 305 in a NAS SMC message from the core network 130-*b*-1 to the UE 115-*c*-1. If the value returned by the MME is the same as the value calculated by UE 115-*c*-1, then communications between core network 130-*b*-1 and UE 115-*c*-1 may proceed as normal. If the values do not match, then the UE 115-*c*-1 includes the information elements (IEs) that were sent in the registration request 355 and that are to be protected in the NAS SMC complete message. In another example, if the values do not match, then the UE 115-*c*-2 may assume that the registration request 355 was compromised and that registration may be reinitiated, such as is explained in relation to FIG. 5. In another example, the MME may include an indication in the NAS SMC message to tell the UE 115-*c*-2 to resend the IEs. The UE 115-*c*-2 may then transmit a NAS SMC complete message that may comprise of protected IEs.

Figure 3B:
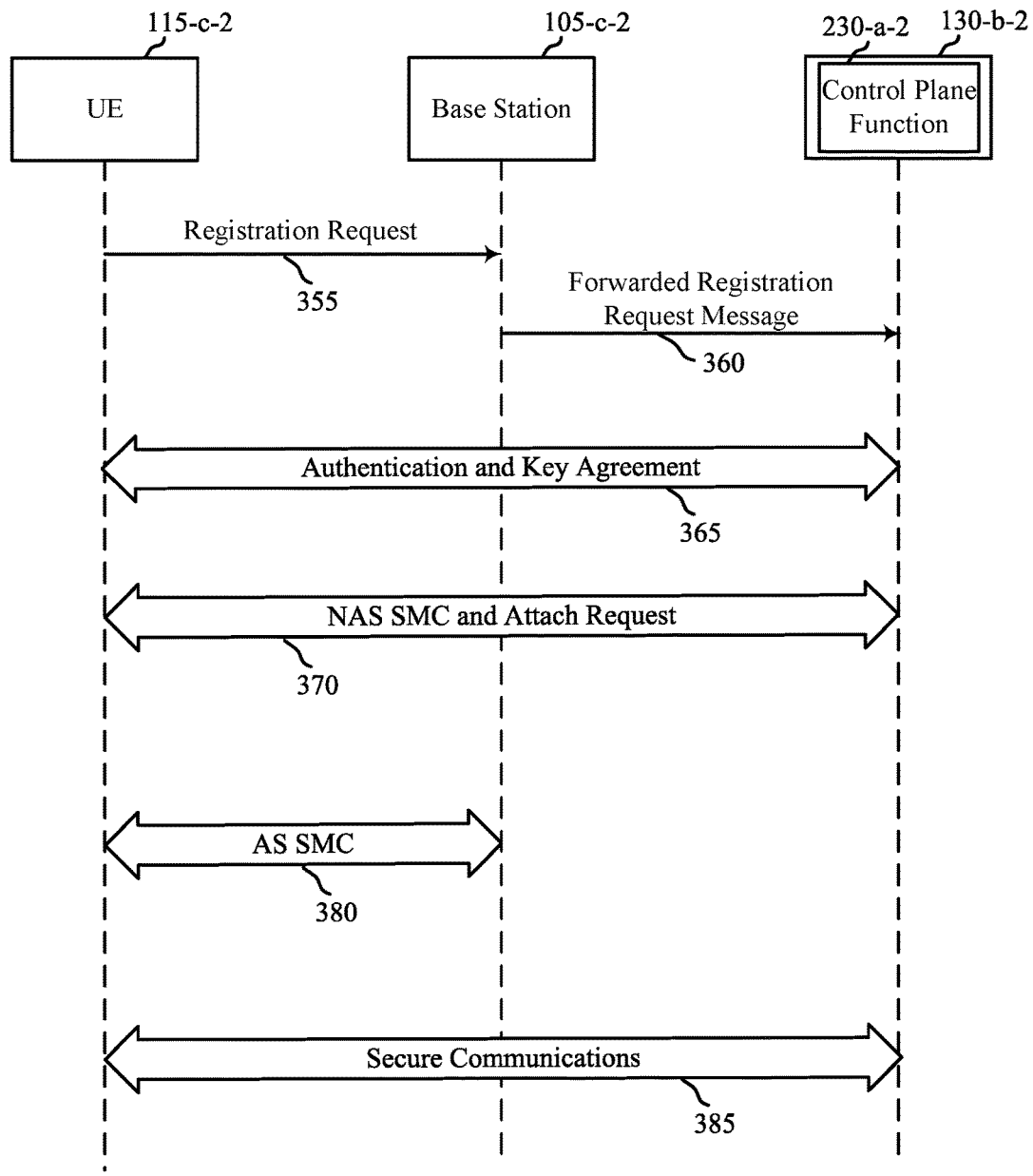

FIG. 3B shows a flow diagram 350 that illustrates a secure connection protocol to protect NAS messages sent by a UE 115-*c*-2. In some cases, flow diagram 350 may represent aspects of techniques performed by a UE 115, base station 105, or core network 130 as described with reference to FIGS. 1-2. Flow diagram 350 (of FIG. 3B) differs from flow diagram 300 (of FIG. 3A) in that the numbers of messages used in flow diagram 350 is reduced with respect to the numbers of messages used in flow diagram 300. The secure connection protocol of FIG. 3B maintains a same number of messages as that used in NAS connection establishment in LTE.

In establishing a secure NAS connection, UE 115-*c*-2 may send a registration request 355 containing minimal UE capability information to base station 105-*c*-2. This minimal UE capability information may include the UE identity (e.g., IMSI or PMSI) and the UE security capability (e.g., supported encryption and integrity protection algorithms). Base station 105-*c*-2 may then forward this information to a component of the core network 130-*b*-2 (for example, the control plane function 230-*a*-2) via forwarded registration request message 360. Upon receiving message 360, core network 130-*b*-2 may then commence an authentication and key agreement (AKA) protocol 365 with UE 115-*c*-2. In some examples, if UE 115-*c*-2 uses a temporary identity that is not recognized by core network 130-*b*-2, then core network 130-*b*-2 may request the UE's identity before commencing AKA protocol 365 with UE 115-*c*-2. The AKA protocol provides procedures for mutual authentication of UE 115-*c*-2 and core network 130-*b*-2. The AKA protocol may involve a specialized security unit, entity, or function, such as an SKMF unit, associated with core network 130-*b*-2 that is responsible for the AKA protocol. In other examples, the specialized security unit may be an MME.

Subsequent to establishing AKA protocol 365, a NAS SMC procedure 370 may be used to establish a secure NAS connection between UE 115-*c*-2 and core network 130-*b*-2. In order to avoid increasing the message count compared to a conventional attach procedure (such as in an LTE attach procedure), UE 115-*c*-2 may also send an attach request in the same transmission as NAS SMC procedure 370. In particular, the attach request may be included with a NAS SMC complete message. The attach request included in transmission 370 may include the UE's capabilities and request services (e.g., voice data, SMS, etc.).

After a successful NAS SMC procedure 370 is conducted between UE 115-*c*-2 and base station 105-*c*-2, subsequent NAS messages between UE 115-*c*-2, base station 105-*c*-2, and core network 130-*b*-2 may be protected, which includes encryption and integrity protection. Upon receipt of the attach request, core network 130-*b*-2 may then create a wireless communication session with UE 115-*c*-2. After NAS SMC 370 is established, the UE 115-*c*-2 may send an AS SMC 380 to base station 105-*c*-2 in order to activate security in the AS and to establish a secure channel between UE 115-*c*-2 and base station 105-*c*-2. Upon establishing a session, all subsequent NAS messages between UE 115-*c*-2 and core network 130-*b*-2 are protected using the established security context as shown in secure communications 385.

In some instances, the registration request 355 may itself be or include an attach request, tracking area update (TAU) request, or service request. In these instances, the UE 115-*c*-2 may calculate a hash of registration request 355. A SHA may be used to calculate the hash. The UE 115-*c*-2 may optionally indicate in the registration request that the UE 115-*c*-2 requests the core network 130-*b*-2 to send the hash of the registration request message in a response or other subsequent message (e.g., NAS SMC message). A component of the core network 130-*b*-2 (such as an MME) may include a hash of registration request 355 in a NAS SMC message from the core network 130-*b*-2 to the UE 115-*c*-2. If the value returned by the MME is the same as the value calculated by UE 115-*c*-2, then communications between core network 130-*b*-2 and UE 115-*c*-2 may proceed as normal.

In one example, if the values do not match, then the UE 115-*c*-2 includes the IEs that were sent in the registration request 355 and that are to be protected in the NAS SMC complete message. In another example, if the values do not match, then the UE 115-*c*-2 may assume that the registration request 355 was compromised and that registration may be reinitiated, such as is explained in relation to FIG. 5. In yet another example, the MME may include an indication in the NAS SMC message to tell the UE 115-*c*-2 to resend the IEs. The UE 115-*c*-2 may then transmit a NAS SMC complete message that may be comprised of protected IEs.

Figure 4A:
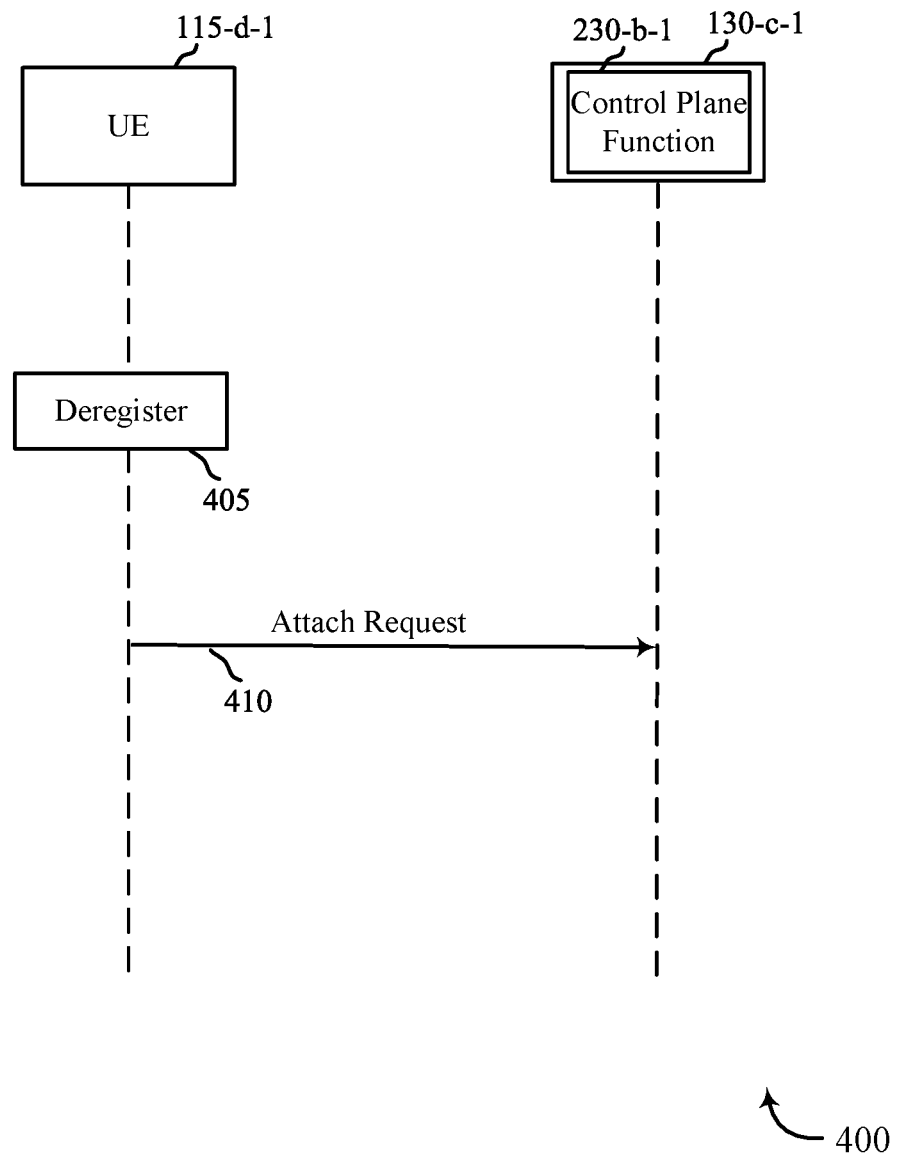
FIGS. 4A and 4B show flow diagrams that illustrate instances of subsequent NAS message protection in different modes in accordance with aspects of the present disclosure.

FIG. 4A shows a flow diagram 400 that illustrates instances of subsequent NAS message protection in different UE operating modes. In some cases, flow diagram 400 may represent aspects of techniques performed by a UE 115, base station 105, or core network 130 as described with reference to FIGS. 1-2. Flow diagram 400 illustrates UE 115-*d*-1 and core network 130-*c*-1 after UE 115-*d*-1 and core network 130-*c*-1 (or at least a component of core network 130-*c*-1, such as a control plane function 230-*b*-1) have established secure NAS communications with each other using a method described in, for example, FIG. 3A or 3B.

In block 405, UE 115-*d*-1 enters into an EPS Mobility Management (EMM) deregistered state. In the EMM deregistered state, the EMM context in core network 130-*c*-1 holds no valid location or routing information for UE 115-*d*-1. In other words, UE 115-*d*-1 is not reachable by core network 130-*c*-1 since the UE's location is not known. In the deregistered state, the previously established security context between UE 115-*d*-1 and core network 130-*c*-1 may still exist. If UE 115-*d*-1 wishes to enter into a registered state, it may send an attach request 410 to core network 130-*c*-1. If a security context exists based on the prior registration, attach request 410 is ciphered, integrity protected, or both ciphered and integrity protected and includes information that enables the control-plane function 230-*b*-1 to locate the corresponding security context. If the security context cannot be located, core network 130-*c*-1 may trigger the establishment of the security context by treating this message as a registration request. The information that is used by core network 130-*c*-1 to identify the UE (e.g., Globally Unique Temporary ID (GUTI)) and locate the UE security context (e.g., evolved key set identifier (eKSI)) is not ciphered but is integrity protected. Additionally, core network 130-*c*-1 may re-establish a new security context with UE 115-*d*-1 by performing a NAS SMC when necessary.

Figure 4B:
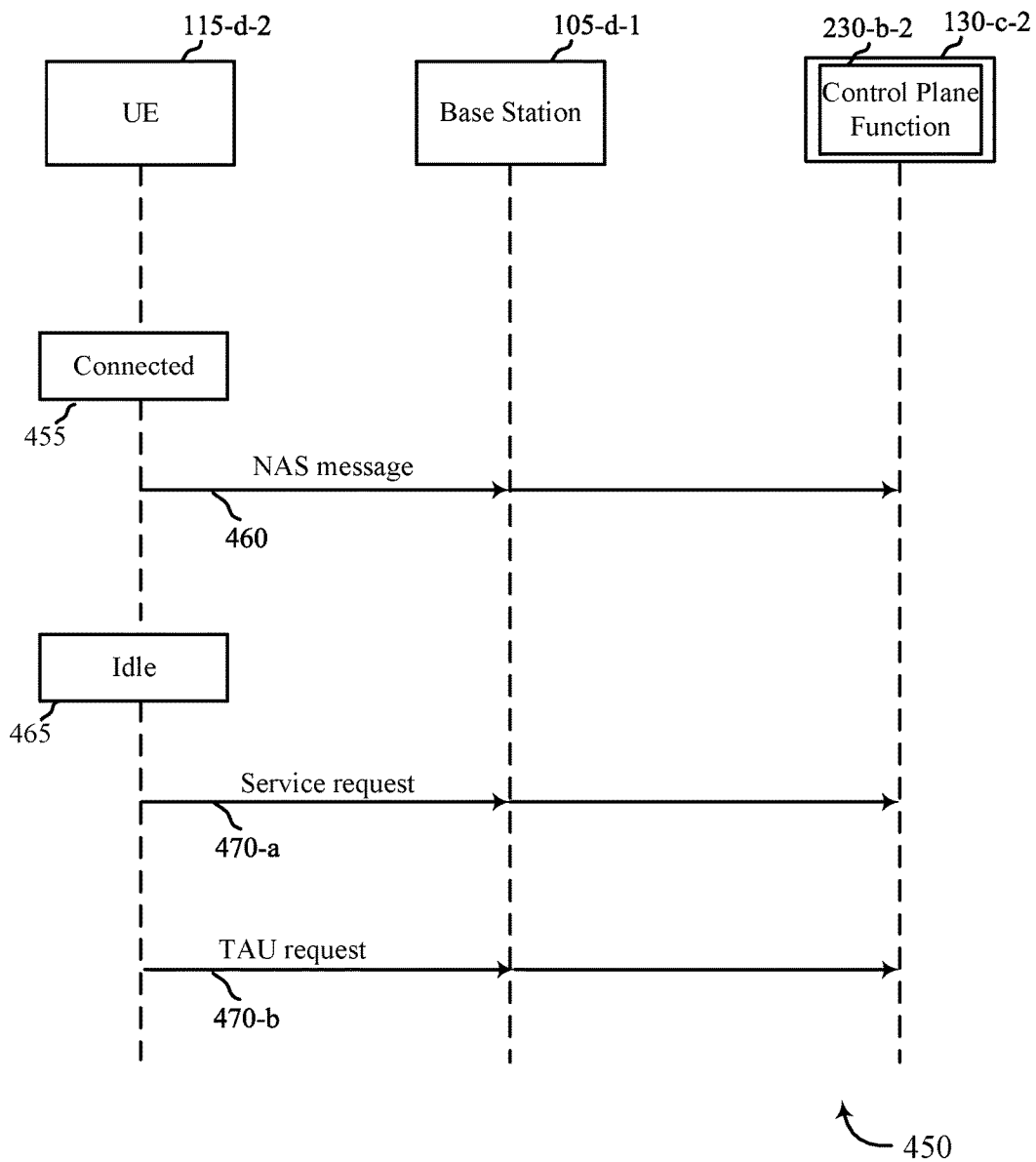

FIG. 4B shows a flow diagram 450 that illustrates instances of subsequent NAS message protection in different modes. In some cases, flow diagram 450 may represent aspects of techniques performed by a UE 115, base station 105, or core network 130 as described with reference to FIGS. 1-2. Flow diagram 450 illustrates UE 115-*d*-2, base station 105-*d*-1, and core network 130-*c*-2 after the UE 115-*d*-2 and core network 130-*c*-2 (or at least a component of core network 130-*c*-2, such as a control plane function 230-*b*-2) have established secure NAS communications with each other using a method described in, for example, FIG. 3A or 3B. Flow diagram 450 may also depict UE 115-*d*-2 and core network 130-*c*-2 in an EMM registered state that may be established via a successful TAU procedure.

In block 455, UE 115-*d*-2 enters into an EPS Connection Management (ECM) connected state. In the ECM connected state, UE 115-*d*-2 is known by core network 130-*c*-2 with an accuracy of the serving base station. In the ECM connected state, the previously established security context between UE 115-*d*-2 and core network 130-*c*-2 may still exist. NAS message 460 and all subsequent NAS messages are sent from UE 115-*d*-2 to base station 105-*d*-1, and then relayed from base station 105-*d*-1 to core network 130-*c*-2. The NAS message 460 and all subsequent NAS messages may be ciphered, integrity protected, or both ciphered and integrity protected.

In block 465, UE 115-*d*-2 enters into an EPS ECM idle state. In the ECM idle state, there is no NAS signaling connection between UE 115-*d*-2 and core network 130-*c*-2. In the ECM idle state, the previously established security context between UE 115-*d*-2 and core network 130-*c*-2 may still exist. UE 115-*d*-2 may initiate a transition from ECM idle state to ECM connected state via NAS messages such as service request 470-*a* and TAU request 470-*b*. Service request 470-*a* and TAU request 470-*b* may be ciphered, integrity protected, or both ciphered and integrity protected. However, the information that is used by core network 130-*c*-2 to identify the UE (e.g., GUTI) and locate the UE security context (i.e., key set identifier or eKSI) is not ciphered but is integrity protected. If the security context cannot be located, core network 130-*c*-2 may trigger the establishment of the security context by treating this message as a registration request. Additionally, core network 130-*c*-2 may re-establish a new security context with UE 115-*d*-2 by performing a NAS SMC when necessary.

Figure 5:
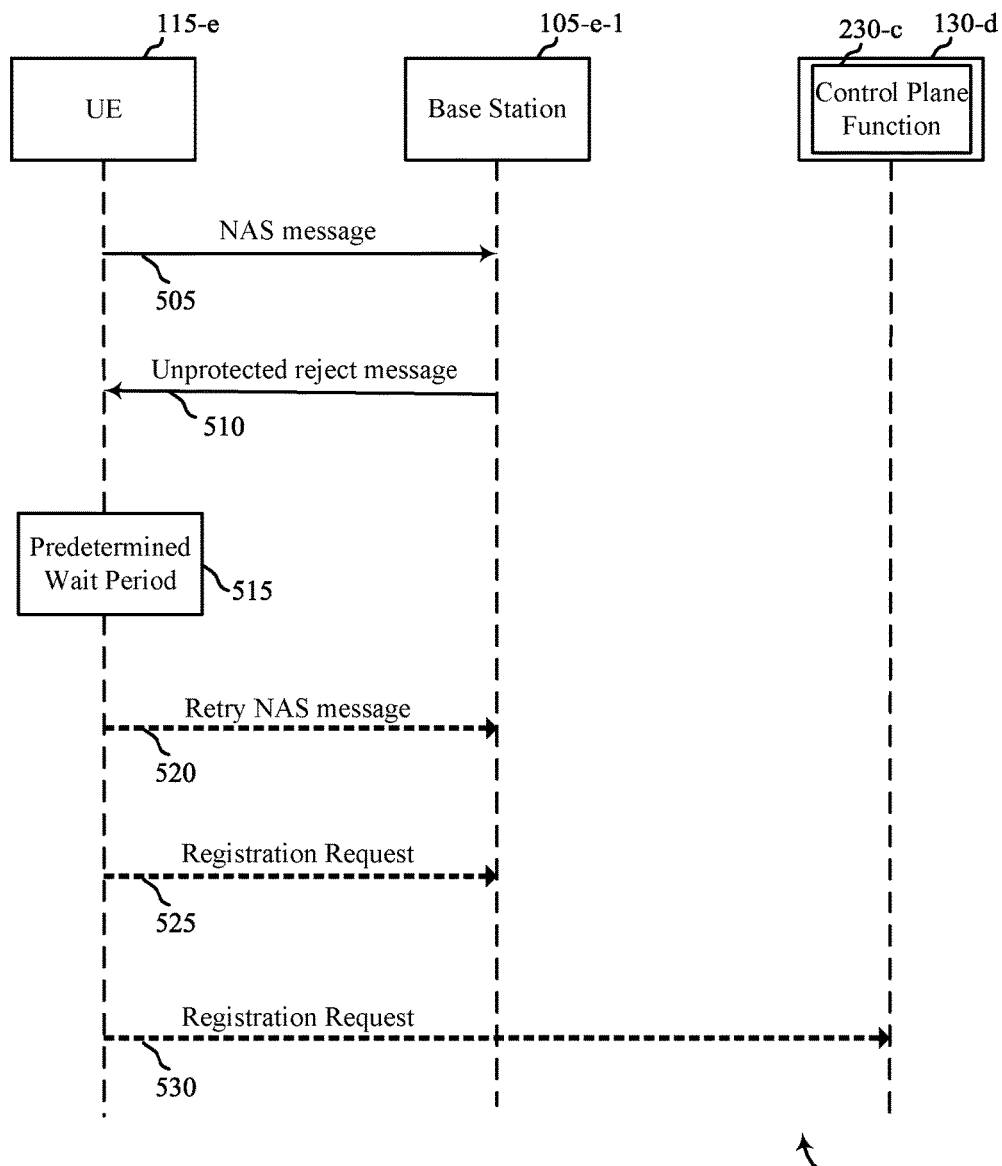
FIG. 5 shows a flow diagram that illustrates a re-registration procedure upon an integrity verification failure in accordance with aspects of the present disclosure.

FIG. 5 shows a flow diagram 500 that illustrates a re-registration procedure upon an integrity verification failure. FIG. 5 shows UE 115-*e*, base station 105-*e*-1, and base station 105-*e*-2, which may be examples of the corresponding devices described with reference to FIG. 1-2. In some cases, flow diagram 500 may represent aspects of techniques performed by a UE 115, base station 105, or core network 130 as described with reference to FIGS. 1-2. UE 115-*e* and base station 105-*e*-1 have already established a secure NAS connection with each other. Due to this secured connection, all NAS messages except for subsequent registration request and reject messages may be protected based on the established security context between the UE 115-*e* and the base station 105-*e*-1. Attach, service, and TAU reject messages are integrity protected between the two if a security context exists.

In flow diagram 500, UE 115-*e* sends NAS message 505 to base station 105-*e*-1. Base station 105-*e*-1 then sends an unprotected reject message 510 in response to NAS message 505. Unprotected reject message 510 may be a NAS attach, service, or TAU reject message. Unprotected reject message 510 may be sent by an attacker or the core network that is associated with UE 115-*e*. The UE 115-*e* may have lost its security context. In one example as a response to unprotected reject message 510, UE 115-*e* may ignore the message and enter into a predetermined wait period 515.

In one example, after the predetermined wait period 515 is over, UE 115-*e* may retry sending the previous NAS message in NAS message 520. In another example, UE 115-*e* may re-initiate a registration procedure with base station 105-*e*-1 by sending a registration request 525. In yet another example, UE 115-*e* may reuse the previous security context and try and register with a different public land mobile network (PLMN) than the one currently serving it. For instance, as shown in FIG. 5, base station 105-*e*-1 is associated with a different PLMN and UE 115-*e* may try to register with the different PLMN (in the form of core network 130-*d* having control plane function 230-*c*) by sending registration request 530. Of note is the fact that UE 115-*e* may initiate a registration procedure when necessary. Also, an integrity verification failure of an attach, service, or TAU request may trigger a registration procedure by the core network serving UE 115-*e*.

Figure 6:
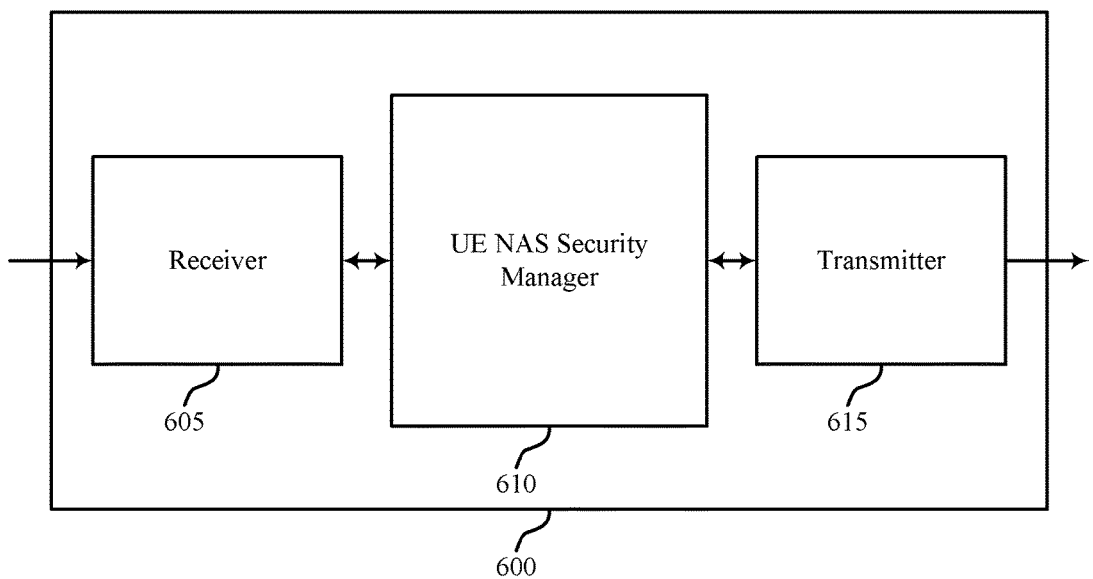
FIGS. 6 through 8 show block diagrams of a wireless device that supports enhanced NAS security in accordance with aspects of the present disclosure.

FIG. 6 shows a block diagram of a wireless device 600 that supports enhanced NAS security in accordance with various aspects of the present disclosure. Wireless device 600 may be an example of aspects of a UE 115 described with reference to FIGS. 1 through 5. Wireless device 600 may include receiver 605, UE NAS security manager 610 and transmitter 615. Wireless device 600 may also include a processor. Each of these components may be in communication with each other.

The receiver 605 may receive information such as packets, user data, or control information associated with various information channels (e.g., control channels, data channels, and information related to enhanced NAS security, etc.). Information may be passed on to other components of the device. The receiver 605 may be an example of aspects of the transceiver 925 described with reference to FIG. 9.

The UE NAS security manager 610 may transmit a registration message to a network to establish a secure connection for NAS messages between the network and a UE, the secure connection based on a UE identifier and security capabilities of the UE included in the registration message, and perform an attach procedure with the network over the secure connection. The UE NAS security manager 610 may also be an example of aspects of the UE NAS security manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
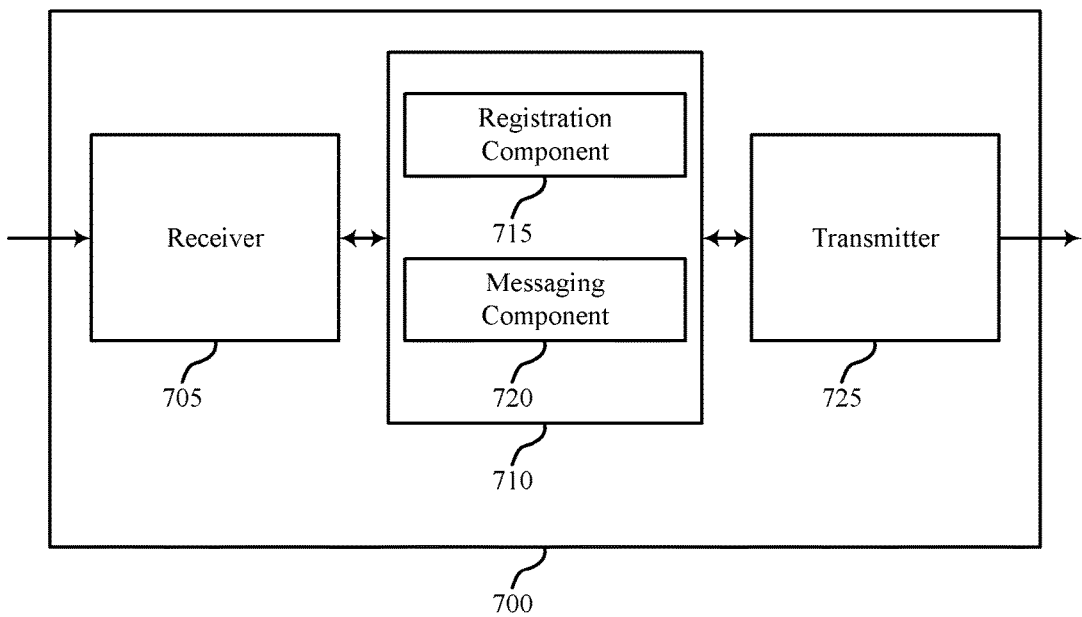

FIG. 7 shows a block diagram of a wireless device 700 that supports enhanced NAS security in accordance with various aspects of the present disclosure. Wireless device 700 may be an example of aspects of a wireless device 600 or a UE 115 described with reference to FIGS. 1 through 6. Wireless device 700 may include receiver 705, UE NAS security manager 710 and transmitter 725. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The UE NAS security manager 710 may be an example of aspects of UE NAS security manager 610 described with reference to FIG. 6. The UE NAS security manager 710 may include registration component 715 and attachment component 720. The UE NAS security manager 710 may be an example of aspects of the UE NAS security manager 905 described with reference to FIG. 9.

The registration component 715 may manage registration procedures such as transmission of a registration message to a network to establish security for NAS messages based on a UE identifier and security capabilities of the UE. The registration component 715 may also transmit a second registration message to the network to establish security for NAS messages based on the UE identifier and security capabilities of the UE included in the second registration message. Additionally, the registration component 715 may transmit a second registration message to a different network to establish security for NAS messages based on the UE identifier and security capabilities of the UE included in the second registration message. Further, the registration component 715 may also coordinate or keep track of a registration state of the UE, including the entering of the UE into a deregistered state with the network such that the network lacks valid location or routing information for the UE, or the entering of the UE into a registered state with the network.

The messaging component 720 may exchange various messages with the network. In some cases, an attach request is piggybacked to a security mode complete message transmitted to the network. The messaging component 720 may transmit, while in the deregistered state, an attach request, the attach request being encrypted and integrity protected under the authentication protocol. The messaging component 720 may transmit an attach request, a service request, or a TAU message, wait a predetermined amount of time after receiving the reject message, re-transmit the previously transmitted attach request, service request, or TAU message prior to transmitting a second registration message, transmit an attach request, a service request, or a TAU message, and perform an attach procedure with the network over the secure connection.

The transmitter 725 may transmit signals received from other components of wireless device 700. In some examples, the transmitter 725 may be collocated with a receiver in a transceiver module. For example, the transmitter 725 may be an example of aspects of the transceiver 925 described with reference to FIG. 9. The transmitter 725 may utilize a single antenna, or it may utilize a plurality of antennas.

Figure 8:
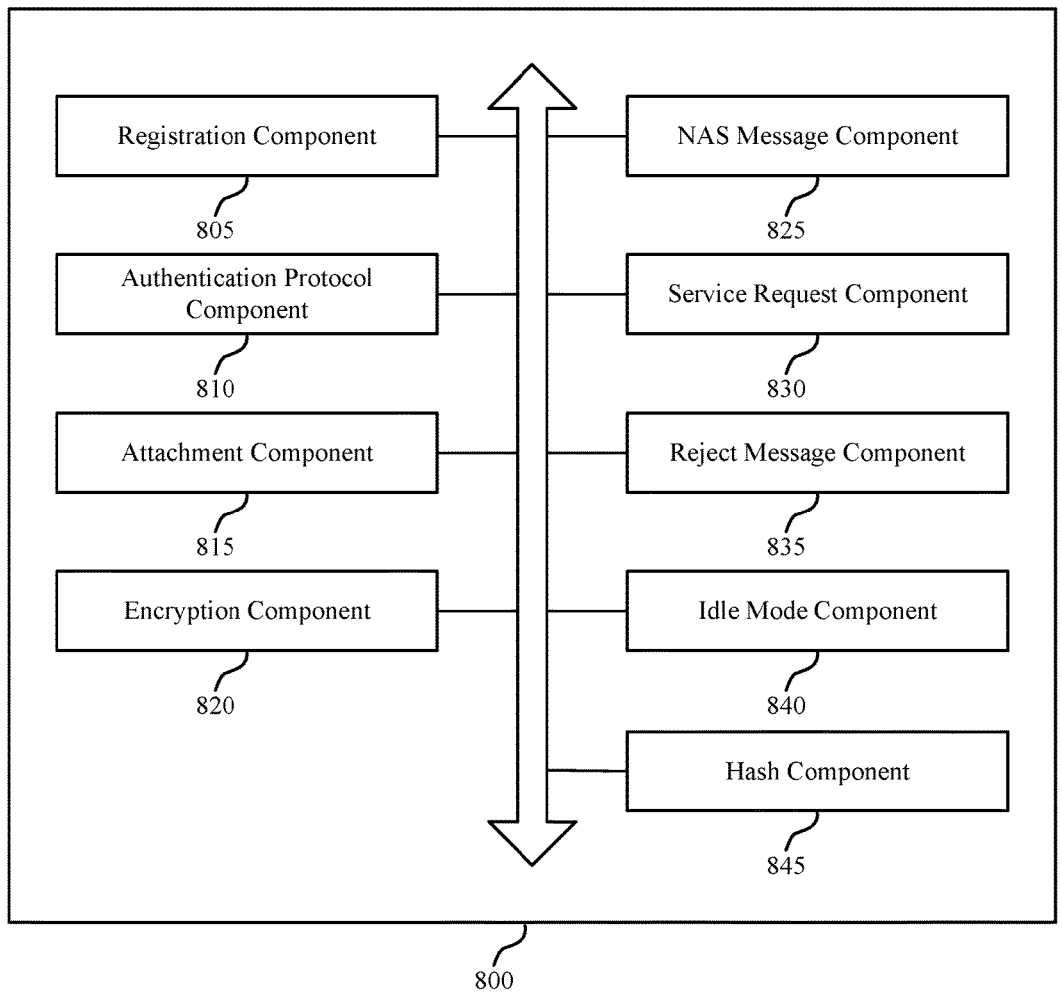

FIG. 8 shows a block diagram of a UE NAS security manager 800 which may be an example of the corresponding component of wireless device 600 or wireless device 700. That is, UE NAS security manager 800 may be an example of aspects of UE NAS security manager 610 or UE NAS security manager 710 described with reference to FIGS. 6 and 7. The UE NAS security manager 800 may also be an example of aspects of the UE NAS security manager 905 described with reference to FIG. 9.

The UE NAS security manager 800 may include registration component 805, authentication protocol component 810, attachment component 815, encryption component 820, NAS message component 825, service request component 830, reject message component 835, idle mode component 840, and hash component 845. Each of these modules may communicate, directly or indirectly, with one another (e.g., via one or more buses).

The registration component 805 may enter into a deregistered state with the network such that the network lacks valid location or routing information for the UE, enter into a registered state with the network, transmit a second registration message to the network to establish security for NAS messages based on the UE identifier and security capabilities of the UE included in the second registration message, transmit a second registration message to a different network to establish security for NAS messages based on the UE identifier and security capabilities of the UE included in the second registration message, and transmit a registration message to a network to establish a secure connection for NAS messages between the network and a UE, the secure connection based on a UE identifier and security capabilities of the UE included in the registration message.

The authentication protocol component 810 may establish, in response to the registration message, an authentication protocol with the network. In some cases, establishing the authentication protocol includes communicating between the UE and a component of the network that is configured for securing NAS messages.

The attachment component 815 may transmit an attach request, the attach request being encrypted and integrity protected under the authentication protocol, transmit an attach request, a service request, or a TAU message, wait a predetermined amount of time after receiving the reject message, re-transmit the previously transmitted attach request, service request, or TAU message prior to transmitting the second registration message, transmit an attach request, a service request, or a TAU message, and perform an attach procedure with the network over the secure connection. In some cases, performing the attach procedure includes transmitting an attach request to access the network. In some cases, the attach request is piggybacked to a security mode complete message transmitted to the network.

The encryption component 820 may encrypt subsequent NAS messages based in part on the authentication protocol. The NAS message component 825 may transmit, while in the registered state, the subsequent NAS messages with encryption and integrity protection in accordance with the authentication protocol.

The service request component 830 may transmit, upon exiting the idle state, a service request that includes a first portion of the service request having integrity protection in accordance with the authentication protocol and a second portion of the service request having encryption and integrity protection in accordance with the authentication protocol. In some cases, the first portion includes at least one of the UE identifier or a key set identifier. In some cases, the service request is a TAU request.

The reject message component 835 may receive a reject message associated with the transmitted attach request, service request, or TAU message, where the reject message is not encrypted or integrity protected in accordance with the authentication protocol, and receive a reject message associated with the transmitted attach request, service request, or TAU message, where the reject message is not encrypted or integrity protected in accordance with the authentication protocol. The idle mode component 840 may enter into an idle state with the network.

The hash component 845 may calculate a hash of the registration request. The hash component 845 may determine whether the values of the calculated hash and a hash of the registration request received from the network match.

Figure 9:
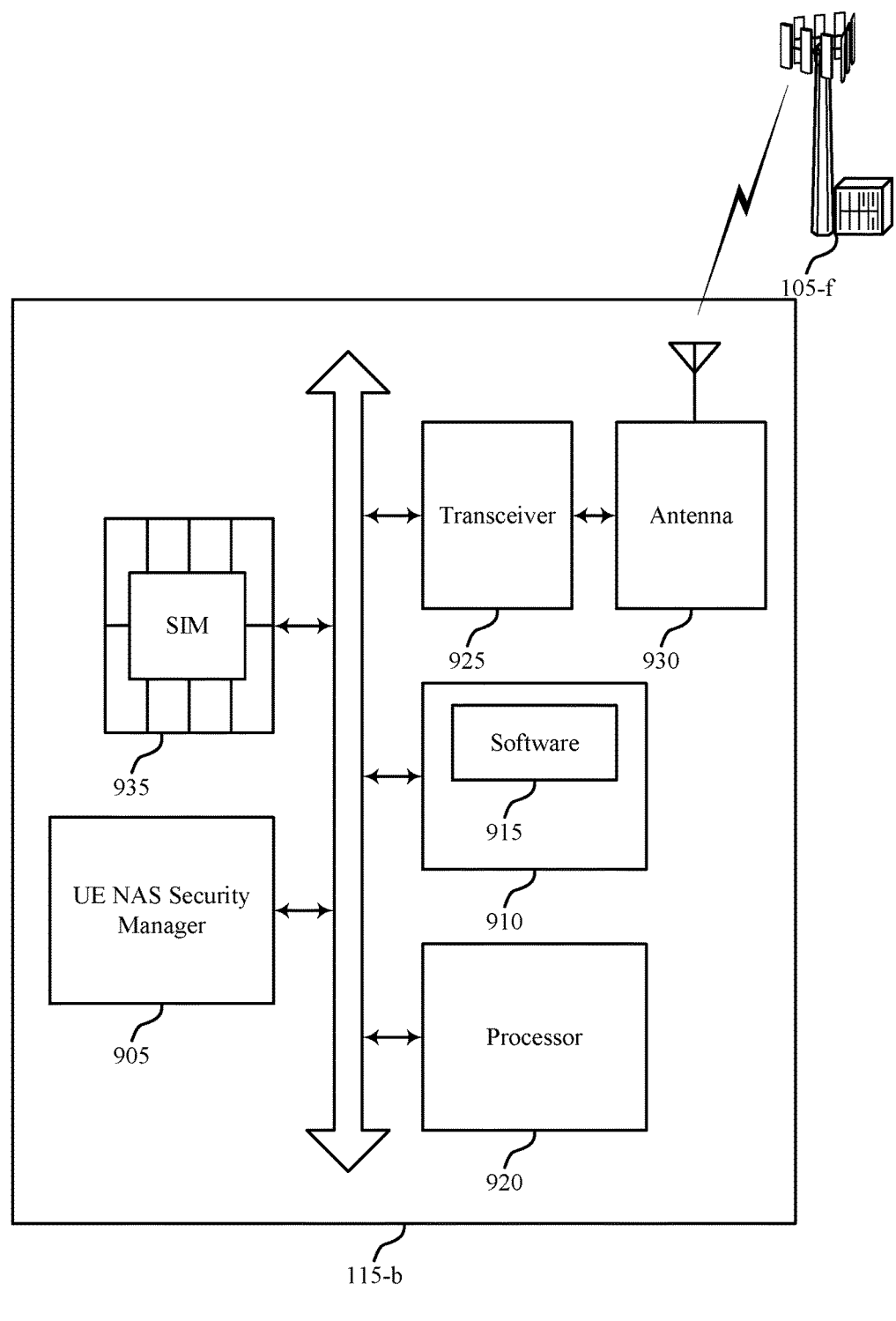
FIG. 9 illustrates a block diagram of a system including a UE that supports enhanced NAS security in accordance with aspects of the present disclosure.

FIG. 9 shows a diagram of a system 900 including a device that supports enhanced NAS security in accordance with various aspects of the present disclosure. For example, system 900 may include UE 115-$f$, which may be an example of a wireless device 600, a wireless device 700, or a UE 115 as described with reference to FIGS. 1, 2 and 6 through 8.

UE 115-$f$ may also include UE NAS security manager 905, memory 910, processor 920, transceiver 925, antenna 930 and ECC module 935. Each of these modules may communicate, directly or indirectly, with one another (e.g., via one or more buses). The UE NAS security manager 905 may be an example of a UE NAS security manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., enhanced NAS security, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

SIM 935 may be an IC that securely stores the international mobile IMSI and the related key used to identify and authenticate a UE 115. SIM 935 may also contain a unique serial number (e.g., an ICCID), security authentication and ciphering information, temporary information related to the local network, a list of the services, a PIN, and a PUK for PIN unlocking. In some cases, SIM 935 may be a circuit embedded in a removable plastic card.

Figure 10:
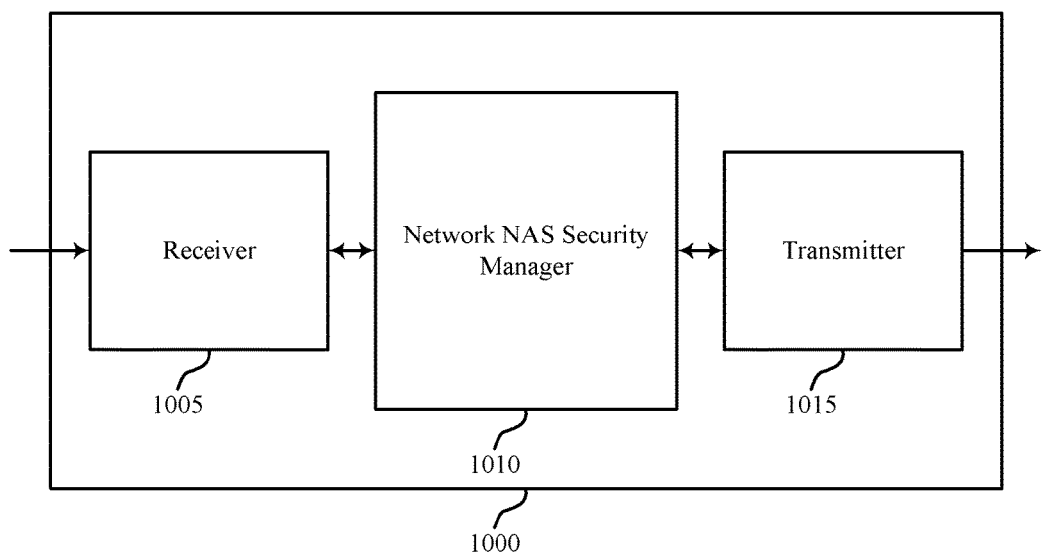
FIGS. 10 through 12 show block diagrams of a wireless device that supports enhanced NAS security in accordance with aspects of the present disclosure.

FIG. 10 shows a block diagram of a wireless device 1000 that supports enhanced NAS security in accordance with various aspects of the present disclosure. Wireless device 1000 may be an example of aspects of a network entity such as core network 130 described with reference to FIGS. 1 through 5. Wireless device 1000 may include receiver 1005, network NAS security manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to enhanced NAS security, etc.). Information may be passed on to other components of the device. The receiver 1005 may be an example of aspects of the transceiver 1325 described with reference to FIG. 13.

The network NAS security manager 1010 may receive a registration message from a UE to establish a secure connection for NAS messages between the UE and a network, the secure connection based on a UE identifier and security capabilities of the UE included in the registration message, and perform an attach procedure with the UE over the secure connection. The network NAS security manager 1010 may also be an example of aspects of the network NAS security manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
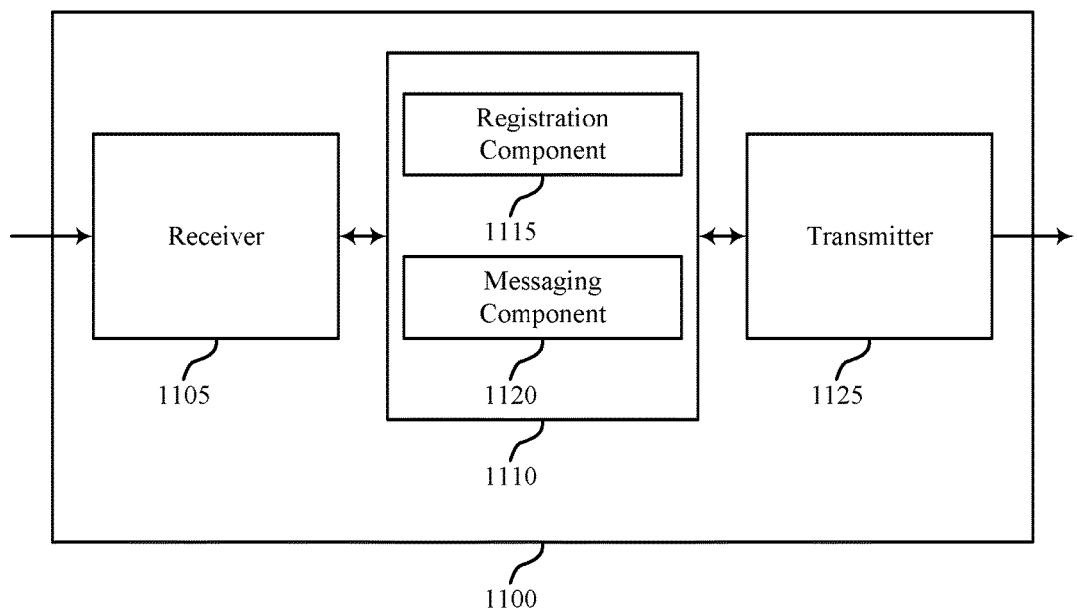

FIG. 11 shows a block diagram of a wireless device 1100 that supports enhanced NAS security in accordance with various aspects of the present disclosure. Wireless device 1100 may be an example of aspects of a wireless device 1000 or a network entity such as a core network 130 described with reference to FIGS. 1 through 5 and 10. Wireless device 1100 may include receiver 1105, network NAS security manager 1110 and transmitter 1125. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The network NAS security manager 1110 may be an example of aspects of network NAS security manager 1010 described with reference to FIG. 10. The network NAS security manager 1110 may include registration component 1115 and attachment component 1120. The network NAS security manager 1110 may be an example of aspects of the network NAS security manager 1305 described with reference to FIG. 13.

The registration component 1115 may receive a registration message from a UE to establish a secure connection for NAS messages between the UE and a network, the secure connection based on a UE identifier and security capabilities of the UE included in the registration message, and receive a second registration message from the UE to establish security for NAS messages based on the UE identifier and security capabilities of the UE included in the second registration message.

The messaging component 1120 may exchange messages with the UE over the secure connection, and receive an attach request, a service request, or a TAU message. In some cases, performing the attach procedure includes receiving an attach request from the UE to access the network. In some cases, the attach request is piggybacked to a security mode complete message transmitted to the network.

The transmitter 1125 may transmit signals received from other components of wireless device 1100. In some examples, the transmitter 1125 may be collocated with a receiver in a transceiver module. For example, the transmitter 1125 may be an example of aspects of the transceiver 1325 described with reference to FIG. 13. The transmitter 1125 may utilize a single antenna, or it may utilize a plurality of antennas.

Figure 12:
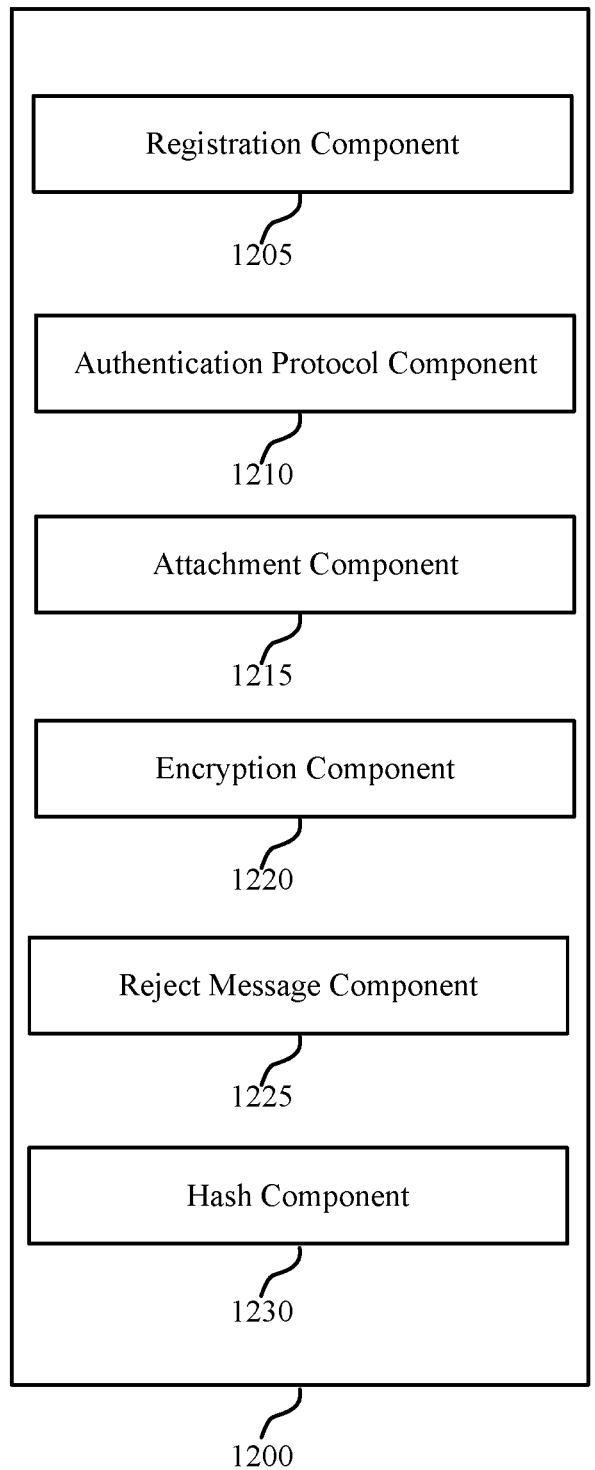

FIG. 12 shows a block diagram of a network NAS security manager 1200 which may be an example of the corresponding component of wireless device 1000 or wireless device 1100. That is, network NAS security manager 1200 may be an example of aspects of network NAS security manager 1010 or network NAS security manager 1110 described with reference to FIGS. 10 and 11. The network NAS security manager 1200 may also be an example of aspects of the network NAS security manager 1305 described with reference to FIG. 13.

The network NAS security manager 1200 may include registration component 1205, authentication protocol component 1210, attachment component 1215, encryption component 1220, reject message component 1225, and hash component 1230. Each of these modules may communicate, directly or indirectly, with one another (e.g., via one or more buses).

The registration component 1205 may receive a registration message from a UE to establish a secure connection for NAS messages between the UE and a network, the secure connection based on a UE identifier and security capabilities of the UE included in the registration message, and receive a second registration message from the UE to establish security for NAS messages based on the UE identifier and security capabilities of the UE included in the second registration message.

The authentication protocol component 1210 may establish, in response to the registration message, an authentication protocol with the UE. The attachment component 1215 may perform an attach procedure with the UE over the secure connection, and receive an attach request, a service request, or a TAU message. In some cases, performing the attach procedure includes receiving an attach request from the UE to access the network. In some cases, the attach request is piggybacked to a security mode complete message transmitted to the network.

Figure 13:
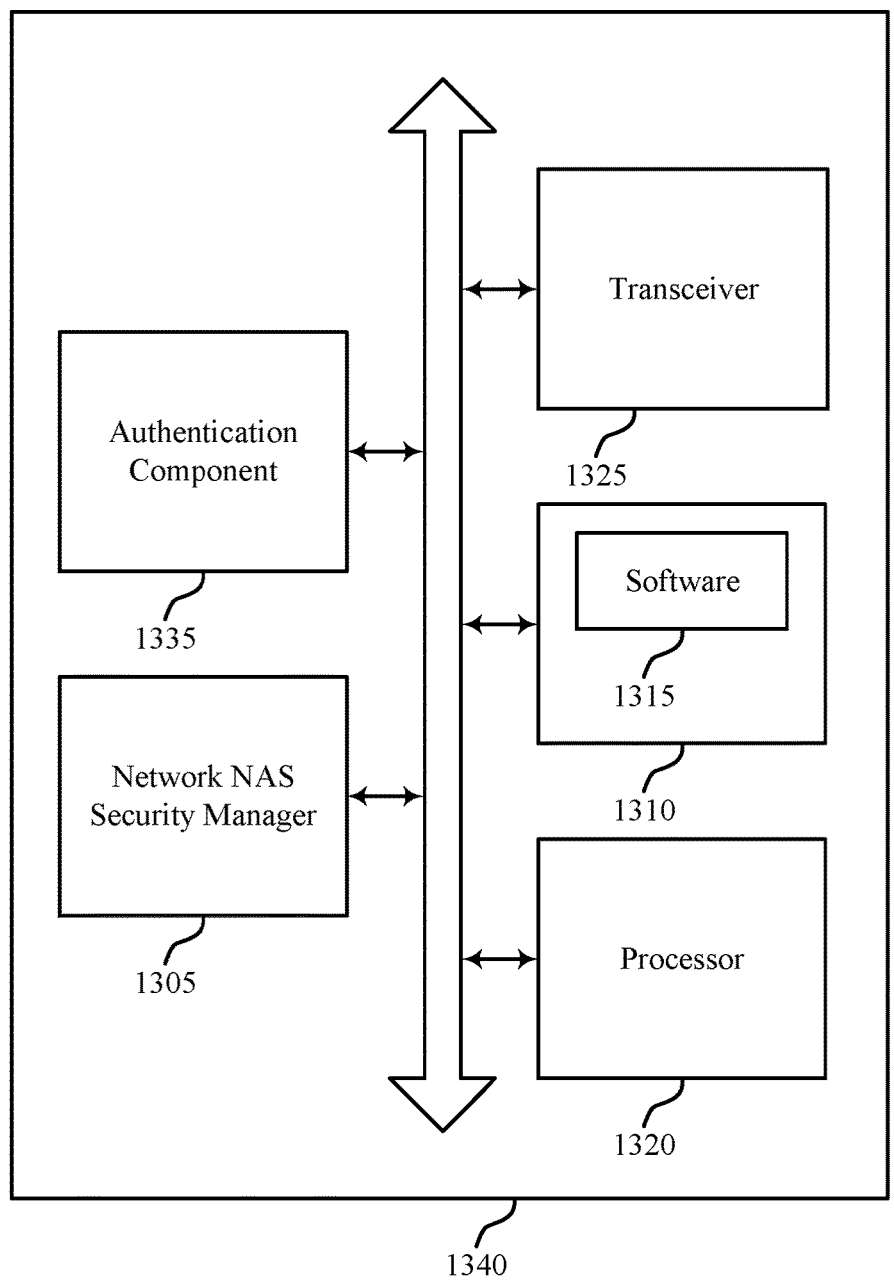
FIG. 13 illustrates a block diagram of a network device that supports enhanced NAS security in accordance with aspects of the present disclosure.

The encryption component 1220 may encrypt subsequent NAS messages based in part on the authentication protocol. The reject message component 1225 may transmit a reject message associated with the received attach request, service request, or TAU message, where the reject message is not encrypted or integrity protected in accordance with the authentication protocol. The registration component 1230 may determine a hash of the received registration message in response to a request contained within the registration message FIG. 13 shows a diagram of a system 1300 including a device that supports enhanced NAS security in accordance with various aspects of the present disclosure. For example, system 1300 may include network entity 1340, which may be an example of a wireless device 1000, a wireless device 1100, or a core network 130 as described with reference to FIGS. 1 through 5 and 10 through 12.

Network entity 1340 may also include network NAS security manager 1305, memory 1310, processor 1320, transceiver 1325, antenna 1330 and ECC module 1335. Each of these modules may communicate, directly or indirectly, with one another (e.g., via one or more buses). The network NAS security manager 1305 may be an example of a network NAS security manager as described with reference to FIGS. 10 through 12.

The memory 1310 may include RAM and ROM. The memory 1310 may store computer-readable, computer-executable software including instructions that, when executed, cause the processor to perform various functions described herein (e.g., enhanced NAS security, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas.

Authentication component 1335 may perform network authentication and security procedures as described herein.

Figure 14:
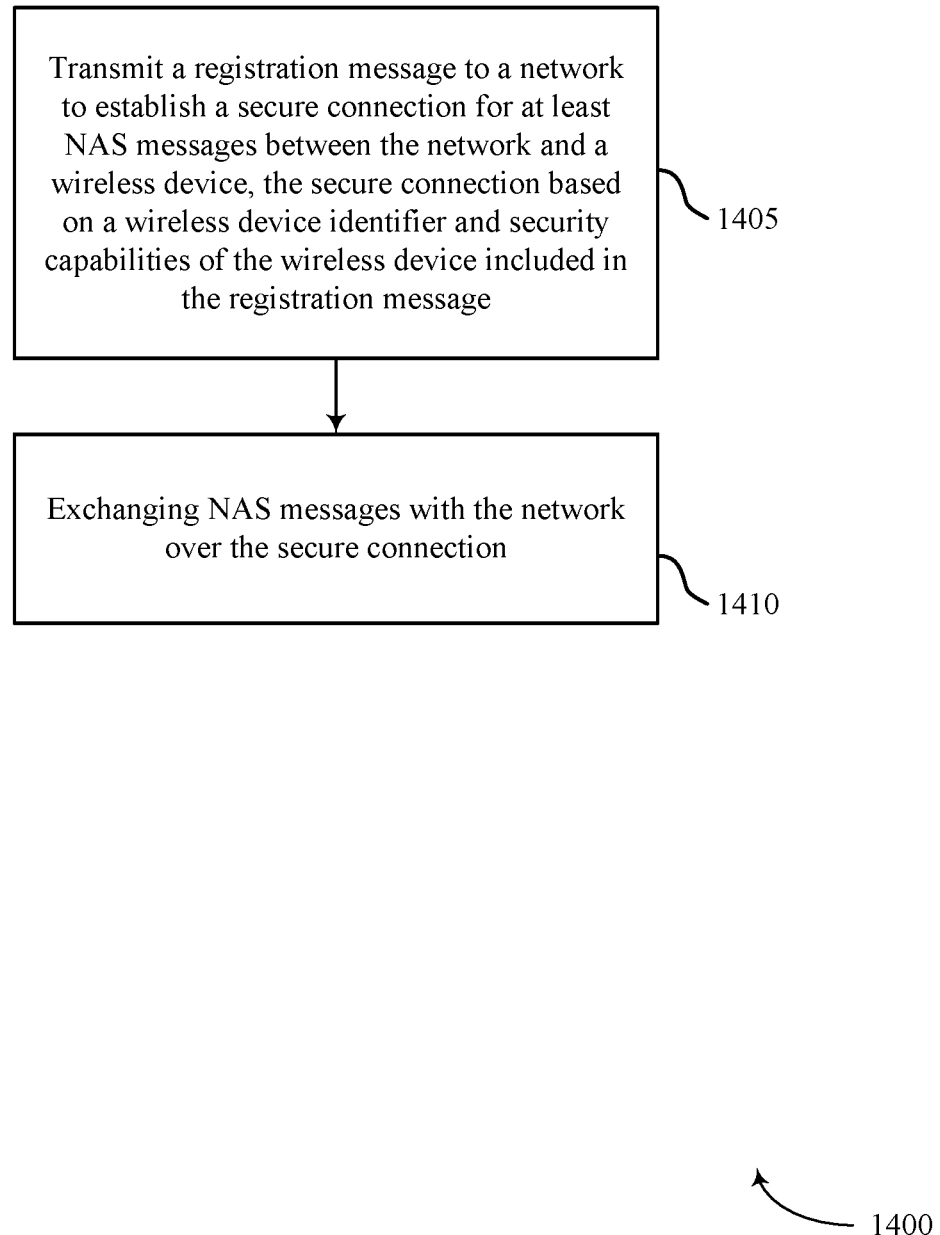
FIGS. 14 through 17 illustrate methods for enhanced NAS security in accordance with aspects of the present disclosure.

FIG. 14 shows a flowchart illustrating a method 1400 for enhanced NAS security in accordance with various aspects of the present disclosure. The operations of method 1400 may be implemented by a wireless device such as a UE 115 or wireless devices 600, 700 or their components as described with reference to FIGS. 1 through 9. For example, the operations of method 1400 may be performed by the UE NAS security manager as described herein. In some examples, the wireless device may execute a set of codes to control the functional elements of the device to perform the functions described below. Additionally or alternatively, the wireless device may perform aspects the functions described below using special-purpose hardware.

At block 1405, the wireless device may transmit a registration message to a network to establish a secure connection for at least NAS messages between the network and the wireless device, the secure connection based on a wireless device identifier and security capabilities of the wireless device included in the registration message as described above with reference to FIGS. 2 through 5. In certain examples, the operations of block 1405 may be performed by the registration component as described with reference to FIGS. 7 and 8.

At block 1410, the wireless device may exchange NAS messages with the network over the secure connection as described above with reference to FIGS. 2 through 5. In certain examples, the operations of block 1410 may be performed by the attachment component as described with reference to FIGS. 7 and 8, and may involve performing an attach procedure.

Figure 15:
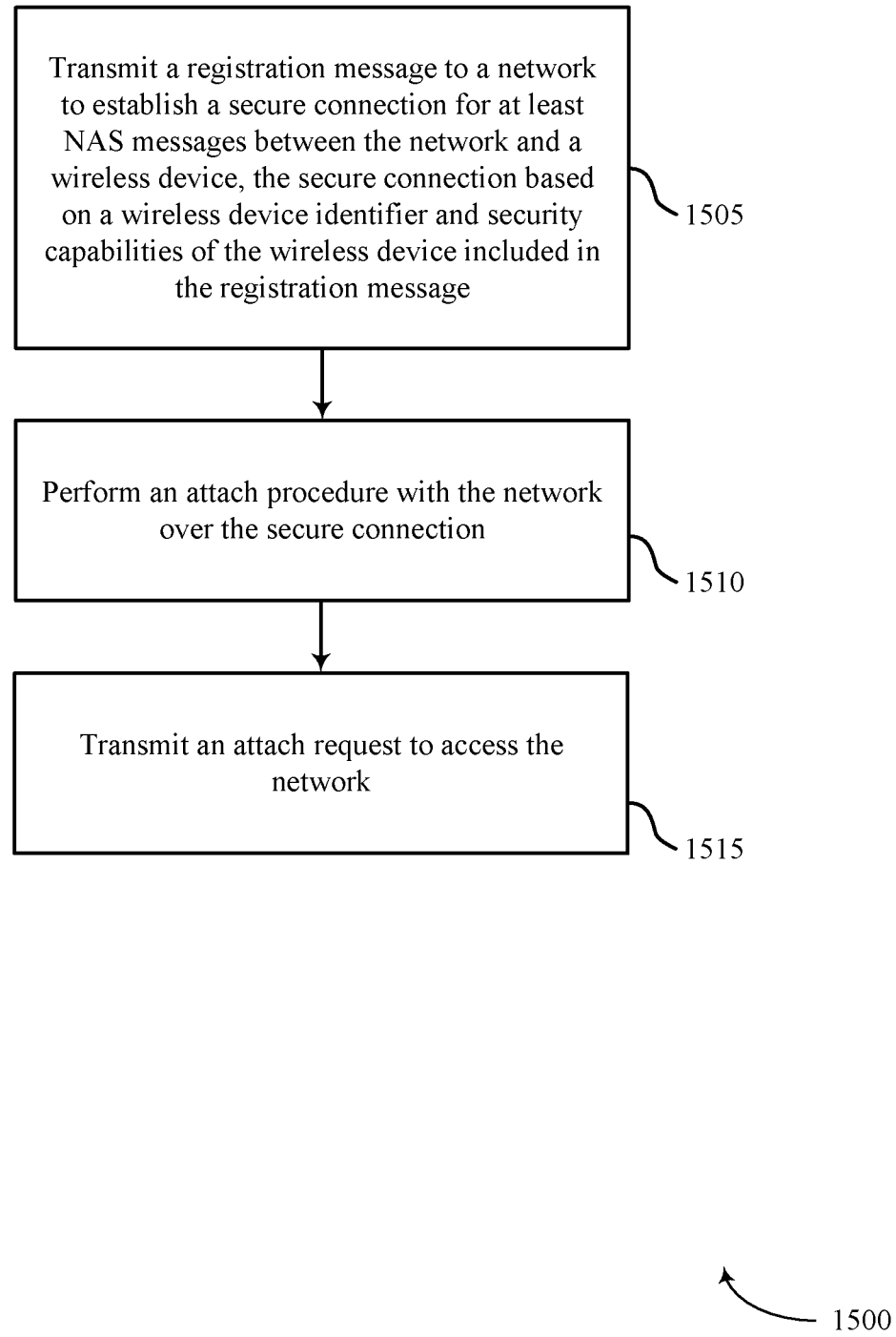

FIG. 15 shows a flowchart illustrating a method 1500 for enhanced NAS security in accordance with various aspects of the present disclosure. The operations of method 1500 may be implemented by a wireless device such as a UE 115 or wireless devices 600, 700 or their components as described with reference to FIGS. 1 through 9. For example, the operations of method 1500 may be performed by the UE NAS security manager as described herein. In some examples, the wireless device may execute a set of codes to control the functional elements of the device to perform the functions described below. Additionally or alternatively, the wireless device may perform aspects the functions described below using special-purpose hardware.

At block 1505, the wireless device may transmit a registration message to a network to establish a secure connection for NAS messages between the network and the wireless device, the secure connection based on a wireless device identifier and security capabilities of the wireless device included in the registration message as described above with reference to FIGS. 2 through 5. In certain examples, the operations of block 1505 may be performed by the registration component as described with reference to FIGS. 7 and 8. This registration message may comprise of less information normally provided by the wireless device to the network under a conventional NAS connection protocol.

At block 1510, the wireless device may perform an attach procedure with the network over the secure connection as described above with reference to FIGS. 2 through 5. In certain examples, the operations of block 1510 may be performed by the attachment component as described with reference to FIGS. 7 and 8. As a part of the attach procedure, wireless device may transmit an attach request to access the network as described above with reference to FIGS. 2 through 5. In some cases, as in block 1515, the attach request is transmitted to the network. This may be done by piggybacking the attach request to a security mode complete message transmitted to the network. Alternatively, the attach request may be sent subsequent to the wireless device and the network establishing a secure NAS connection. This may be achieved through a successful security mode command procedure. The attach request may include a request for services such as a TAU request. After the attach procedure is completed, all subsequent NAS communications between the wireless device and the network are ciphered, integrity protected, or both ciphered and integrity protected.

Figure 16:
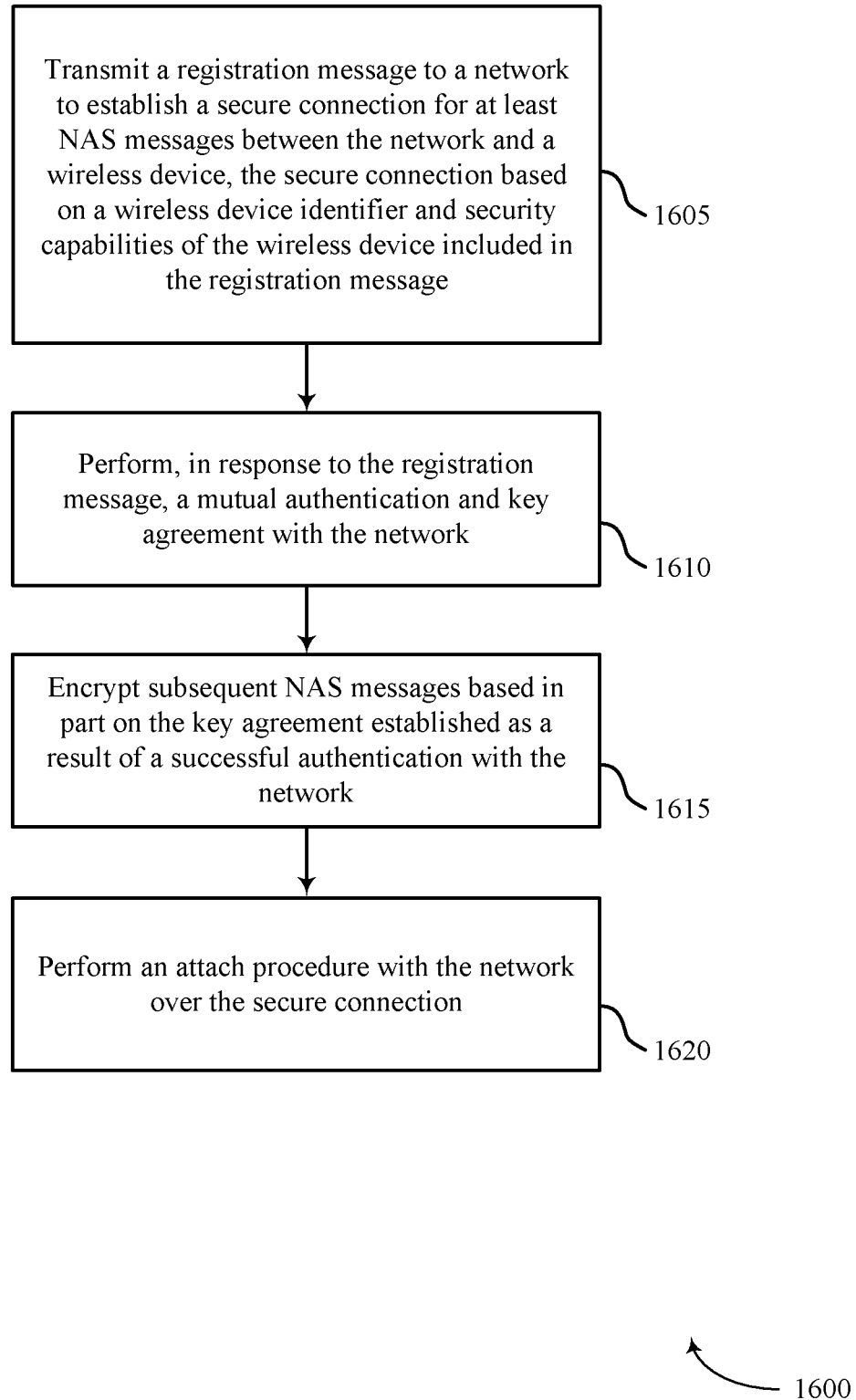

FIG. 16 shows a flowchart illustrating a method 1600 for enhanced NAS security in accordance with various aspects of the present disclosure. The operations of method 1600 may be implemented by a wireless device such as a UE 115 or wireless devices 600, 700 or their components as described with reference to FIGS. 1 through 9. For example, the operations of method 1600 may be performed by the UE NAS security manager as described herein. In some examples, the wireless device may execute a set of codes to control the functional elements of the device to perform the functions described below. Additionally or alternatively, the wireless device may perform aspects the functions described below using special-purpose hardware.

At block 1605, the wireless device may transmit a registration message to a network to establish a secure connection for at least NAS messages between the network and the wireless device, the secure connection based on a wireless device identifier and security capabilities of the wireless device included in the registration message as described above with reference to FIGS. 2 through 5. In certain examples, the operations of block 1605 may be performed by the registration component as described with reference to FIGS. 7 and 8.

At block 1610, the wireless device may perform, in response to the registration message, a mutual authentication and key agreement with the network as described above with reference to FIGS. 2 through 5. In certain examples, the operations of block 1610 may be performed by the authentication protocol component as described with reference to FIGS. 7 and 8. The authentication protocol may be an authentication and key agreement between the wireless device and the network. A component associated with the network that is configured for securing NAS messages may send an authentication response back to the MME or the security component of the network that contains a key.

At block 1615, the UE 115 may encrypt subsequent NAS messages based in part on the key agreement established as a result of a successful authentication with the network as described above with reference to FIGS. 2 through 5. In certain examples, the operations of block 1615 may be performed by the encryption component as described with reference to FIGS. 7 and 8. These NAS messages may be encrypted under the same security context even if the wireless device changes operating modes or if the wireless device receives unprotected NAS attach, service, or TAU reject messages.

At block 1620, the wireless device may perform an attach procedure with the network over the secure connection as described above with reference to FIGS. 2 through 5. In certain examples, the operations of block 1620 may be performed by the attachment component as described with reference to FIGS. 7 and 8. After the attach procedure is completed, all subsequent NAS communications between the wireless device and the network are ciphered, integrity protected, or both ciphered and integrity protected.

Figure 17:
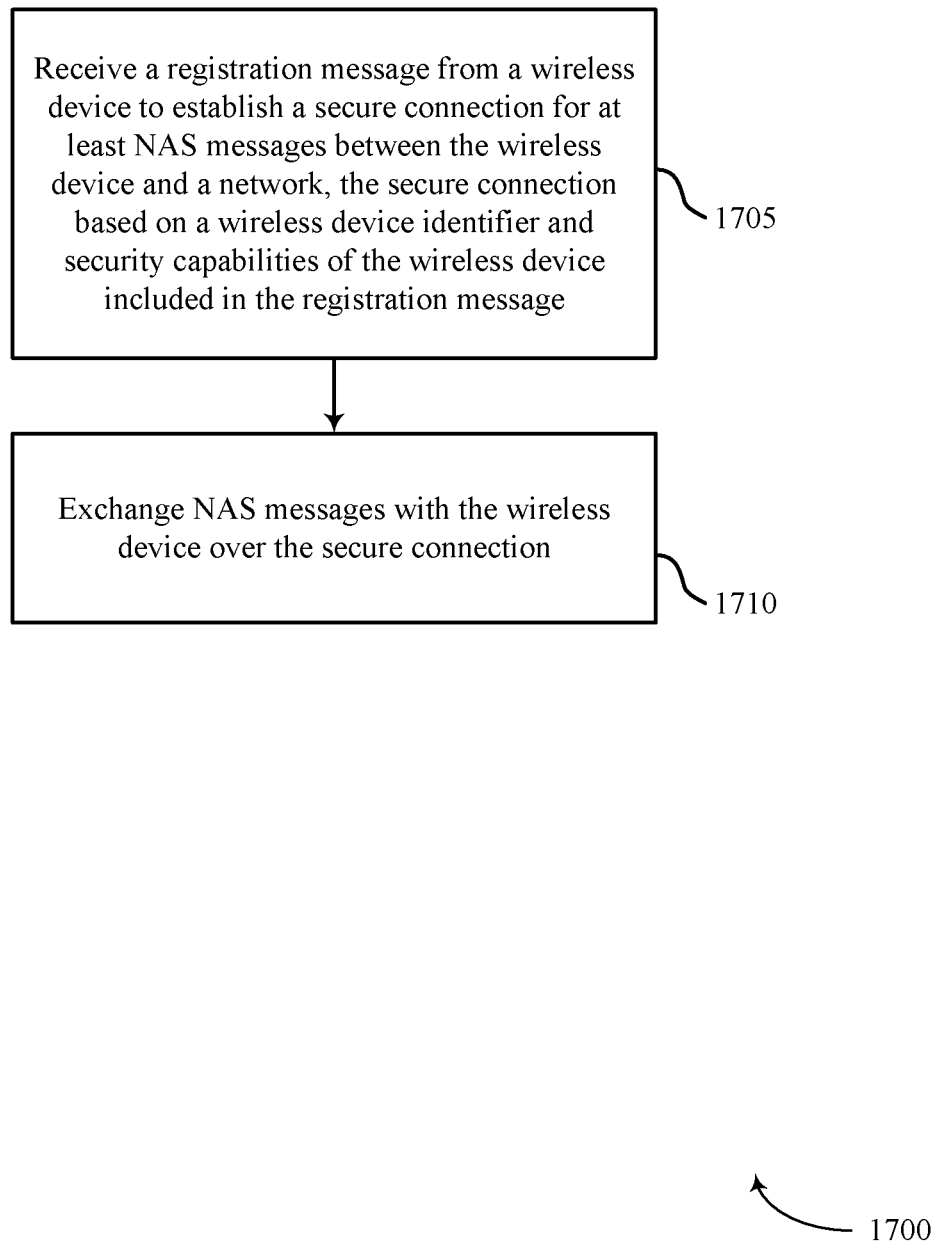

FIG. 17 shows a flowchart illustrating a method 1700 for enhanced NAS security in accordance with various aspects of the present disclosure. The operations of method 1700 may be implemented by a device such as a core network 130 or wireless devices 1000, 1100 or their components as described with reference to FIGS. 1 through 5 and 10 through 13. For example, the operations of method 1700 may be performed by the network NAS security manager as described herein. In some examples, the core network 130 may execute a set of codes to control the functional elements of the device to perform the functions described below. Additionally or alternatively, the core network 130 may perform aspects the functions described below using special-purpose hardware.

At block 1705, the core network 130 may receive a registration message from a wireless device to establish a secure connection for at least NAS messages between the wireless device and a network, the secure connection based on a wireless device identifier and security capabilities of the wireless device included in the registration message as described above with reference to FIGS. 2 through 5. In certain examples, the operations of block 1705 may be performed by the registration component as described with reference to FIGS. 11 and 12.

At block 1710, the core network 130 may exchange NAS messages with the wireless device over the secure connection as described above with reference to FIGS. 2 through 5. In certain examples, the operations of block 1710 may be performed by the attachment component as described with reference to FIGS. 11 and 12, and may involve performing an attach procedure. After the attach procedure is completed, all subsequent NAS communications between the wireless device and the network are ciphered, integrity protected, or both ciphered and integrity protected.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for enhanced NAS security.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for enhanced NAS security. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one IC. In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
transmitting a registration message to a network to establish a secure connection for at least non-access stratum (NAS) messages between the network and a wireless device, wherein the secure connection is established based at least in part on a first set of wireless device characteristics comprising a wireless device identifier and security capabilities of the wireless device included in the registration message;
transmitting a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and
exchanging NAS messages with the network over the secure connection.

2. The method of claim 1, wherein the second message is piggybacked to a security mode complete message transmitted to the network.

3. The method of claim 1, wherein the registration message comprises a tracking area update (TAU) request message or a service request message.

4. The method of claim 1, further comprising:
performing, in response to the registration message, a mutual authentication and key agreement with the network; and
encrypting subsequent NAS messages based in part on the key agreement established as a result of a successful authentication with the network.

5. The method of claim 4, further comprising:
entering into a deregistered state with the network; and
transmitting, while in the deregistered state, a third message, the third message being encrypted and integrity protected under the mutual authentication and key agreement.

6. The method of claim 4, further comprising:
entering into a registered state with the network; and
transmitting, while in the registered state, the subsequent NAS messages with encryption and integrity protection in accordance with the mutual authentication and key agreement.

7. The method of claim 4, further comprising:
entering into an idle state with the network; and
transmitting, upon exiting the idle state, a service request that includes a first portion of the service request having integrity protection based on a security context established during the successful authentication with the network, and a second portion of the service request having encryption and integrity protection based on the security context.

8. The method of claim 7, wherein the first portion includes at least one of the wireless device identifier or a key set identifier.

9. The method of claim 4, further comprising:
transmitting a service request or a tracking area update (TAU) message;
receiving a reject message associated with the transmitted service request or TAU message, wherein the reject message is not encrypted or integrity protected based on a security context established during the successful authentication with the network; and
transmitting a second registration message to the network to establish security with the network based on the wireless device identifier and security capabilities of the wireless device included in the second registration message.

10. The method of claim 9, further comprising:
waiting a predetermined amount of time after receiving the reject message; and re-transmitting the previously transmitted service request or TAU message prior to transmitting the second registration message.

11. The method of claim 4, further comprising:
transmitting a service request or a tracking area update (TAU) message;
receiving a reject message associated with the transmitted service request or TAU message, wherein the reject message is not encrypted or integrity protected based on a security context established during the successful authentication with the network; and
transmitting a second registration message to a different network to establish security with the network based on the wireless device identifier and security capabilities of the wireless device included in the second registration message.

12. The method of claim 4, wherein performing the mutual authentication and key agreement comprises:
communicating between the wireless device and a component of the network that is configured for securing NAS messages.

13. The method of claim 1, further comprising:
calculating a hash of the registration request;
receiving a hash of the registration request from the network subsequent to the transmitted registration message; and
determining whether the values of the calculated hash and the received hash match.

14. The method of claim 13, further comprising:
retransmitting at least one information element contained within the registration message upon determining that the calculated and received hash values do not match.

15. The method of claim 13, further comprising:
retransmitting the registration message to the network upon determining that the calculated and received hash values do not match.

16. A method of wireless communication comprising:
receiving a registration message from a wireless device to establish a secure connection for at least non-access stratum (NAS) messages between the wireless device and a network, wherein the secure connection is established based at least in part on a first set of wireless device characteristics comprising a wireless device identifier and security capabilities of the wireless device included in the registration message;
receiving a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and
exchanging NAS messages with the wireless device over the secure connection.

17. The method of claim 16, wherein the second message is piggybacked to a security mode complete message transmitted to the network.

18. The method of claim 16, wherein the registration message comprises a tracking area update (TAU) request message or a service request message.

19. The method of claim 16, further comprising:
performing, in response to the registration message, a mutual authentication and key agreement with the wireless device; and
encrypting subsequent NAS messages based in part on the key agreement established as a result of a successful authentication with the wireless device.

20. The method of claim 19, further comprising:
receiving a service request or a tracking area update (TAU) message;
transmitting a reject message associated with the received service request or TAU message, wherein the reject message is not encrypted or integrity protected based on a security context established during the successful authentication with the wireless device; and
receiving a second registration message from the wireless device to establish security with the wireless device based on the wireless device identifier and security capabilities of the wireless device included in the second registration message.

21. The method of claim 19, wherein performing the mutual authentication and key agreement comprises:
communicating between the wireless device and a component of the network that is configured for securing NAS messages.

22. The method of claim 16, further comprising:
determining a hash of the received registration message in response to a request contained within the registration message; and transmitting the hash to the wireless device.

23. An apparatus for wireless communication comprising:
means for transmitting a registration message to a network to establish a secure connection for at least non-access stratum (NAS) messages between the network and a wireless device, wherein the secure connection is established based at least in part on a first set of wireless device characteristics comprising a wireless device identifier and security capabilities of the wireless device included in the registration message;
means for transmitting a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and
means for exchanging NAS messages with the network over the secure connection.

24. An apparatus for wireless communication comprising:
means for receiving a registration message from a device to establish a secure connection for at least non-access stratum (NAS) messages between the wireless device and a network, wherein the secure connection is established based at least in part on a first set of wireless device characteristics comprising a wireless device identifier and security capabilities of the wireless device included in the registration message;
means for receiving a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and
means for exchanging NAS messages with the wireless device over the secure connection.

25. An apparatus for wireless communication, comprising:
a processor;
memory in electronic communication with the processor; and
instructions stored in the memory and operable, when executed by the processor, to cause the apparatus to:
transmit a registration message to a network to establish a secure connection for at least non-access stratum (NAS) messages between the network and a wireless device, wherein the secure connection is established based at least in part on a first set of wireless device characteristics comprising a wireless device identifier and security capabilities of the wireless device included in the registration message;
transmit a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and exchange NAS messages with the network over the secure connection.

26. The apparatus of claim 25, wherein the second message is piggybacked to a security mode complete message transmitted to the network.

27. The apparatus of claim 25, wherein the registration message comprises a tracking area update (TAU) request message or a service request message.

28. The apparatus of claim 25, wherein the instructions are operable to cause the processor to:
perform, in response to the registration message, a mutual authentication and key agreement with the network; and
encrypt subsequent NAS messages based in part on the key agreement established as a result of a successful authentication with the network.

29. The apparatus of claim 28, wherein the instructions are operable to cause the processor to:
enter into a deregistered state with the network; and
transmit, while in the deregistered state, a third message, the third message being encrypted and integrity protected under the mutual authentication and key agreement.

30. The apparatus of claim 28, wherein the instructions are operable to cause the processor to:
enter into a registered state with the network; and
transmit, while in the registered state, the subsequent NAS messages with encryption and integrity protection in accordance with the mutual authentication and key agreement.

31. The apparatus of claim 28, wherein the instructions are operable to cause the processor to:
enter into an idle state with the network; and
transmit, upon exiting the idle state, a service request that includes a first portion of the service request having integrity protection based on a security context established during the successful authentication with the network, and a second portion of the service request having encryption and integrity protection based on the security context.

32. The apparatus of claim 31, wherein the first portion includes at least one of the wireless device identifier or a key set identifier.

33. The apparatus of claim 28, wherein the instructions are operable to cause the processor to:
transmit a service request or a tracking area update (TAU) message;
receive a reject message associated with the transmitted service request or TAU message, wherein the reject message is not encrypted or integrity protected based on a security context established during the successful authentication with the network; and
transmit a second registration message to the network to establish security with the network based on the wireless device identifier and security capabilities of the wireless device included in the second registration message.

34. The apparatus of claim 33, wherein the instructions are operable to cause the processor to:
wait a predetermined amount of time after receiving the reject message; and re-transmit the previously transmitted service request or TAU message prior to transmitting the second registration message.

35. The apparatus of claim 28, wherein the instructions are operable to cause the processor to:
transmit a service request or a tracking area update (TAU) message;
receive a reject message associated with the transmitted service request or TAU message, wherein the reject message is not encrypted or integrity protected based on a security context established during the successful authentication with the network; and
transmit a second registration message to a different network to establish security with the network based on the wireless device identifier and security capabilities of the wireless device included in the second registration message.

36. The apparatus of claim 28, wherein the instructions operable to cause the apparatus to perform the mutual authentication and key agreement comprise instructions operable to cause the apparatus to:
communicate between the wireless device and a component of the network that is configured for securing NAS messages.

37. The apparatus of claim 25, wherein the instructions are operable to cause the processor to:
calculate a hash of the registration request;
receive a hash of the registration request from the network subsequent to the transmitted registration message; and
determine whether the values of the calculated hash and the received hash match.

38. The apparatus of claim 37, wherein the instructions are operable to cause the processor to:
retransmit at least one information element contained within the registration message upon determining that the calculated and received hash values do not match.

39. The apparatus of claim 37, wherein the instructions are operable to cause the processor to:
retransmit the registration message to the network upon determining that the calculated and received hash values do not match.

40. An apparatus for wireless communication, comprising:
a processor;
memory in electronic communication with the processor; and
instructions stored in the memory and operable, when executed by the processor, to cause the apparatus to:
receive a registration message from a wireless device to establish a secure connection for at least non-access stratum (NAS) messages between the wireless device and a network, wherein the secure connection is established based at least in part on a first set of wireless device characteristics comprising a wireless device identifier and security capabilities of the wireless device included in the registration message;
receive a second message to access the network via the secure connection, the second message comprising a second set of wireless device characteristics, wherein the second set of wireless device characteristics comprises one or more service capabilities of the wireless device, wherein at least some of the one or more service capabilities included in the second message were not included in the registration message; and
exchange NAS messages with the wireless device over the secure connection.

41. The apparatus of claim 40, wherein the second message is piggybacked to a security mode complete message transmitted to the network.

42. The apparatus of claim 40, wherein the registration message comprises is a tracking area update (TAU) request message or a service request message.

43. The apparatus of claim 40, wherein the instructions are operable to cause the processor to: perform, in response to the registration message, a mutual authentication and key agreement with the wireless device; and encrypt subsequent NAS messages based in part on the key agreement established as a result of a successful authentication with the wireless device.

44. The apparatus of claim 43, wherein the instructions are operable to cause the processor to: receive, a service request or a tracking area update (TAU) message; transmit a reject message associated with the received service request or TAU message, wherein the reject message is not encrypted or integrity protected based on a security context established during the successful authentication with the wireless device; and receive a second registration message from the wireless device to establish security with the wireless device based on the wireless device identifier and security capabilities of the wireless device included in the second registration message.

45. The apparatus of claim 43, wherein the instructions operable to cause the apparatus to perform the mutual authentication and key agreement comprise instructions operable to cause the apparatus to: communicate between the wireless device and a component of the network that is configured for securing NAS messages.

46. The apparatus of claim 45, wherein the instructions are operable to cause the processor to: determine a hash of the received registration message in response to a request contained within the registration message; and transmit the hash to the wireless device.

* * * * *